United States Patent
Bauman

(10) Patent No.: US 6,480,927 B1
(45) Date of Patent: Nov. 12, 2002

(54) HIGH-PERFORMANCE MODULAR MEMORY SYSTEM WITH CROSSBAR CONNECTIONS

(75) Inventor: Mitchell A. Bauman, Circle Pines, MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/001,592

(22) Filed: Dec. 31, 1997

(51) Int. Cl.[7] ............................ G06F 12/08; G06F 13/00
(52) U.S. Cl. .................. 710/317; 710/306; 711/154; 711/149
(58) Field of Search ............................... 711/155, 167, 711/168, 149, 148, 154; 710/5, 20, 21, 52, 317, 316, 306; 370/412, 231

(56) References Cited

U.S. PATENT DOCUMENTS

| | | | |
|---|---|---|---|
| 5,081,575 A | | 1/1992 | Hiller et al. .................. 710/317 |
| 5,533,201 A | | 7/1996 | Benton et al. ............... 710/100 |
| 5,561,784 A | * | 10/1996 | Chen et al. ................... 711/157 |
| 5,594,918 A | * | 1/1997 | Knowles et al. ............... 712/15 |
| 5,721,828 A | * | 2/1998 | Frisch ......................... 709/217 |
| 5,802,580 A | * | 9/1998 | McAlpine .................... 711/149 |
| 5,860,159 A | * | 1/1999 | Hagersten .................... 711/151 |
| 5,890,217 A | * | 3/1999 | Kabemoto et al. ........... 711/141 |
| 5,912,889 A | * | 6/1999 | Preas et al. .................. 370/359 |
| 5,931,938 A | * | 8/1999 | Drogichen et al. ............ 712/15 |
| 5,933,624 A | * | 8/1999 | Balmer ........................ 709/400 |
| 6,009,092 A | * | 12/1999 | Basilico ....................... 370/352 |
| 6,038,644 A | * | 3/2000 | Irie et al. ..................... 711/141 |
| 6,070,003 A | * | 5/2000 | Gove et al. .................. 710/317 |
| 6,098,110 A | * | 8/2000 | Witkowski et al. .......... 709/249 |
| 6,260,073 B1 | * | 7/2001 | Walker et al. ............... 370/412 |
| 6,301,256 B1 | * | 10/2001 | Vasa ........................... 370/401 |

OTHER PUBLICATIONS

Y. Liu et al. Simulation and analysis of enhanced switch architectures for interconnection networks in massively parallel shared memory machines, Parallel Computation, 1988, pp. 487–490.*

(List continued on next page.)

Primary Examiner—Matthew Kim
Assistant Examiner—Pierre-Michel Bataille
(74) Attorney, Agent, or Firm—Michael B. Atlass; Charles A. Johnson; Mark T. Starr

(57) ABSTRACT

A modular, expandable, multi-port main memory system that includes multiple point-to-point switch interconnections and a highly-parallel data path structure that allows multiple memory operations to occur simultaneously. The main memory system includes an expandable number of modular Memory Storage Units, each of which are mapped to a portion of the total address space of the main memory system, and may be accessed simultaneously. Each of the Memory Storage Units includes a predetermined number of memory ports, and an expandable number of memory banks, wherein each of the memory banks may be accessed simultaneously. Each of the memory banks is also modular, and includes an expandable number of memory devices each having a selectable memory capacity. All of the memory devices in the system may be performing different memory read or write operations substantially simultaneously and in parallel. Multiple data paths within each of the Memory Storage Units allow data transfer operations to occur to each of the multiple memory ports in parallel. Simultaneously with the transfer operations occurring to the memory ports, unrelated data transfer operations may occur to multiple ones of the memory devices within all memory banks in parallel. The main memory system further incorporates independent storage devices and control logic to implement a directory-based coherency protocol. Thus the main memory system is adapted to providing the flexibility, bandpass, and memory coherency needed to support a high-speed multiprocessor environment.

8 Claims, 16 Drawing Sheets

OTHER PUBLICATIONS

B.R. Carlile, "Algorithms and design: the CRAY APP shared–memory system", Compcon Spring '93, Digest of Papers, pp.: 312–320,:Feb. 22–26, 1993.*

L.N. Bhuyan et al., "Performance of multistage bus networks for a distributed shared memory multiprocessor", IEEE Transactions on Parallel and Distributed Systems, pp.: 82–95, Jan. 1997.*

Katevenis et al., "Pipelined memory Shared Buffer for VLSI Switches", ACM Transactions (SIGCOMM), pp. 39–48, 1995.*

* cited by examiner

*Figure 1* Symmetrical Multiprocessing Platform

Processing Module (POD)

Input/Output Module

Sub-Processing Module (Sub-POD)

Memory Storage Unit (MSU)

Memory Cluster (MCL)

*Data Crossbar (MDA)*

*POD Data Block*

MSU Data Block

Memory Controller (MCA)

POD Address Control Block

Memory Cluster Control Block

*MSU Operations*

| Fig. 13A | Fig. 13B |

*MSU Operations*

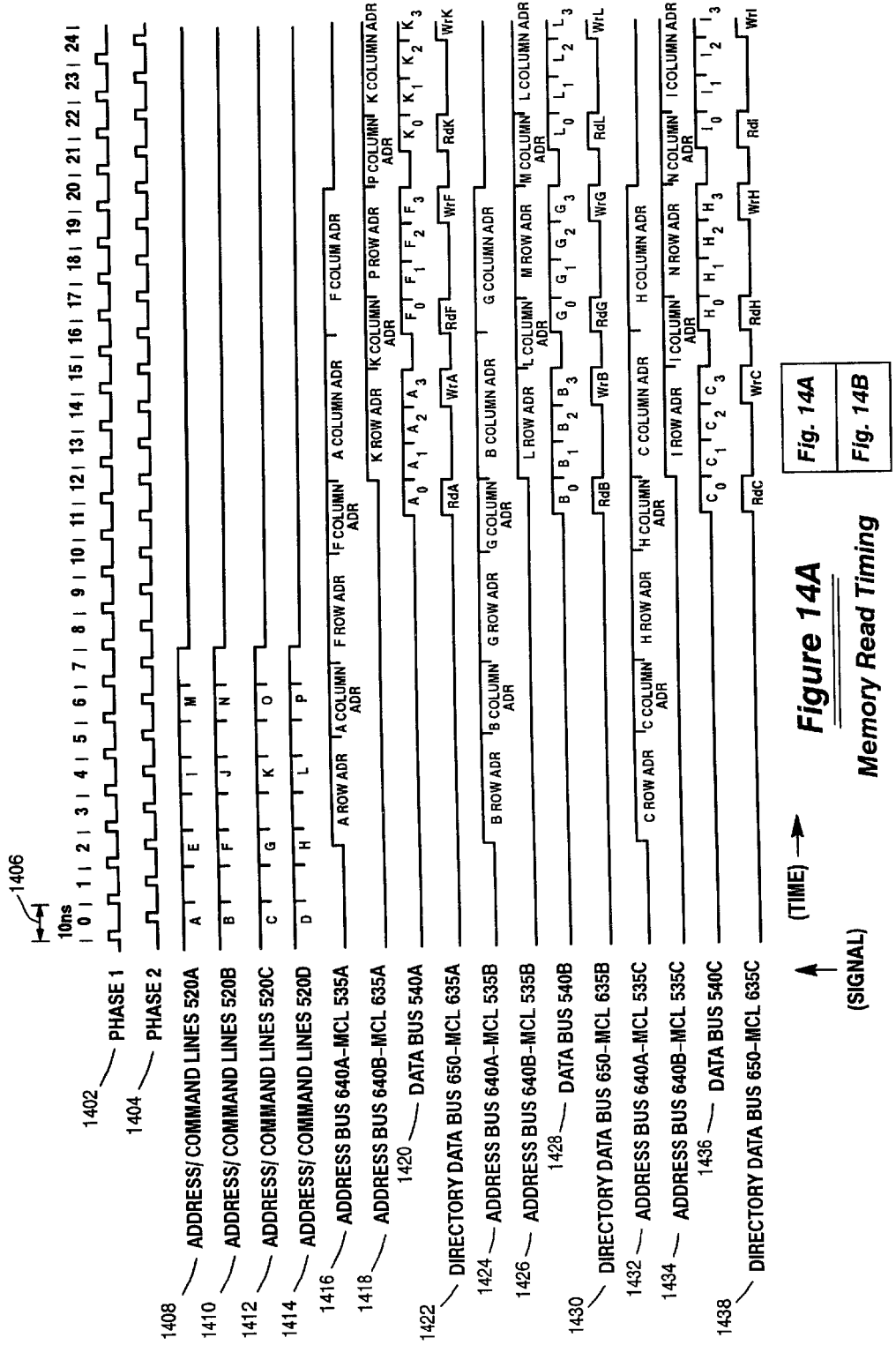

MEMORY READ TIMING

HIGH-PERFORMANCE MODULAR MEMORY SYSTEM WITH CROSSBAR CONNECTIONS

CROSS-REFERENCE TO OTHER APPLICATIONS

The following co-pending applications of common assignee contain some common disclosure:

"A Directory-Based Cache Coherency System" U.S. patent application Ser. No. 08/965,00 assigned to the Assignee hereof, (1521.0080000), filed Nov. 5, 1997, incorporated herein by reference in its entirety;

"Message Flow Protocol for Avoiding Deadlocks", U.S. patent application Ser. No. 08/964,606, now U.S. Pat. No. 6,014,709 assigned to the Assignee hereof, (1521.0220000), filed Nov. 5, 1997, incorporated herein by reference in its entirety; and "High-Speed Memory Storage Unit for a Multiprocessor System Having Integrated Directory and Data Storage Subsystems", U.S. patent application Ser. No. 09/001,588, now U.S. Pat. No. 6,415,364 assigned to the assignee hereof, filed Dec. 31, 1997, incorporated herein by reference in its entirety.

FIELD OF THE INVENTION

This invention relates generally to a shared main memory system for use within a large-scale multiprocessor system, and, more specifically, to a high performing, multi-port shared main memory system that includes an expandable number of memory sub-units, wherein all sub-units may be participating in memory operations substantially simultaneously, the main memory further includes an expandable number of dedicated point-to-point interconnections for connecting selected ones of the sub-units each to a different one of the memory ports for transferring data in parallel between the selected sub-units and the memory ports, thereby providing a memory system that is capable of supporting the bandpass requirements of a modern high-speed Symmetrical MultiProcessor (SMP) system, and is further capable of expanding as those requirements increase.

DESCRIPTION OF THE PRIOR ART

Many data processing systems couple multiple processors through a shared memory. The processors may then communicate through the shared memory, and may also be allowed to process tasks in parallel to increase system throughput.

Coupling multiple processors to a single memory system presents several challenges for system designers. The memory system must have an increased bandpass to service the requests from multiple processors in a timely manner. Moreover, since many medium and large-scale multiprocessor systems are modular, and allow for the addition of processors to accommodate an increase in user demands, it is desirable: to provide a memory system that is also capable of expanding to provide an increased memory capacity, and/or to include the capability to receive requests from additional processors. Finally, because many multiprocessor systems include cache memories coupled to one or more of the processors within the system so that multiple copies of the same data may be resident within multiple memories in the system at once, a memory coherency protocol is necessary. A memory coherency protocol ensures that every processor always operates on the latest copy of the data. For example, memory coherency guarantees that a processor requesting a data item from main memory will receive the most updated copy of the data, even if the most recent copy only resides in another processor's local cache.

Often, a memory design satisfies one of these design considerations at the expense of the others. For example, one way to achieve an expandable system is to interconnect one or more processors and their associated caches via a bused structure to a shared main memory. Increased processing capability and expanded memory capacity may be achieved by adding processors, and memory units, respectively, to the bus. Such a bused architecture also makes implementation of a coherency scheme relatively simple. In a bused system, each processor on the bus can monitor, or "snoop", the bus, to determined if any of the operations of the other processors on the bus are affecting the state of data held locally within their respective cache. However, bused systems of this type do not achieve parallelism. Only one processor may use the bus at a given time to access a given memory module, and thus memory will perform only one operation at once. Moreover, the arbitration required to determined bus usage imposes additional overhead. As a result, memory latency increases as more processors are added to the system. Thus, a single-bus architecture is not a good choice in systems having more than a few processors.

Memory latency may be somewhat reduced by using a multi-port main memory system which interfaces to the processors and their local caches via multiple buses. This allows the memory to receive multiple requests in parallel. Moreover, some multi-port memories are capable of processing ones of these multiple requests in parallel. This provides increased parallelism, but latency is still a problem if the system is expanded so that more than several processors are resident on the same bus. Additionally, this scheme complicates the coherency situation because processors may no longer snoop a single bus to ensure that they have the most recent data within their local caches. Instead, another coherency protocol must be utilized. To ensure memory coherency in a multi-bus system, caches may be required to send invalidation requests to all other caches following a modification to a cached data item. Invalidation requests alert the caches receiving these requests to the fact that the most recent copy of the data item resides in. another local cache. Although this method maintains coherency, the overhead imposed by sending invalidation requests becomes prohibitive as the number of processors in the system increases.

Another approach to balancing the competing interests associated with providing an improved memory system for a parallel processing environment involves the use of a crossbar system. A crossbar system acts as a switching network which selectively interconnects each processor and its local cache to a main memory via a dedicated, point-to-point interface. This removes the problems associated with bus utilization, and provides a much high memory bandpass. However, generally, crossbar systems may not be readily expanded. A single crossbar switching network has a predetermined number of switched cross points placed at intersections between the processors and memory modules. These switched cross points may accommodate a predetermined maximum number of processors and memory modules. Once each of the switched cross points is utilized, the system may not be further expanded. Moreover, such a distributed system poses an increased challenge for maintaining memory coherency. Although an invalidation approach similar to the one described above may be utilized, the routing of these requests over each of the point-to-point interfaces to each of the local caches associated with the processors increases system overhead.

Thus, what is needed is an expandable main memory system capable of supporting a parallel processing environment. The memory system must be capable of receiving, in parallel, and processing, in parallel, a multiple number of requests. The memory system must further be capable of maintaining coherency between all intercoupled cache memories in the system.

OBJECTS

The primary object of the invention is to provide an improved shared memory system for a multiprocessor data processing system, A further object of the invention is to provide a shared memory system having a predetermined address range that can be divided into address sub-ranges, wherein a read or a write operation may be performed to all of the address sub-ranges substantially simultaneously, A still further object of the invention is to provide a memory system having multiple ports, and wherein requests for memory access may be received on each of the multiple ports in parallel;

Another object of the invention is to provide a shared memory system having multiple memory ports, and a predetermined address range divided into. address sub-ranges, wherein a data transfer operation may be occurring in parallel between each different one of the memory ports and each different one of the address sub-ranges, A further object of the invention is to provide a shared memory system having multiple memory sub-units each of which maps to an address sub-range, and leach of which may be performing a memory operation in parallel with all other sub-units, and wherein queued memory requests are scheduled for processing based on the availability of the memory sub-units, A further object of the invention is to provide a memory system having a predetermined address range that can be divided into address sub-ranges each mapped to a different memory sub-unit, and wherein additional memory sub-units may be added to the system as memory requirements increase;

A yet further object of the invention is to provide an expandable memory system having a selectable number of memory sub-units each for providing a portion of the storage capacity of the memory system and wherein each of the memory sub-units is expandable to include a selectable number of memory expansion units, wherein the storage capacity of each of the memory expansion units is selectable;

Another object of the invention is to provide a memory system having sub-units each mapped to a predetermined range of memory addresses, and wherein data may be read from, or written to, each of the sub-units simultaneously, Yet another object of the invention is to provide a memory system having sub-units each mapped to a predetermined range of memory addresses, and wherein each of the sub-units has a selectable number of memory expansion units, and wherein each of the memory expansion units within each of the sub-units may be performing memory operations in parallel;

Another object of the invention is to provide a memory system having sub-units each for performing multiple memory operations substantially simultaneously, and wherein each of the sub-units has a common bus structure capable of supporting each of the simultaneously occurring operations by interleaving address and data signals, Another object of the invention is to provide a main memory system capable of storing and maintaining directory state information for use in implementing a directory-based coherency protocol, A yet further object of the invention is to provide a multi-port main memory system capable of routing data between a first unit coupled to a first one of the memory ports, and a second unit coupled to a second one of the memory ports, Another object of the invention is to provide a multi-port main memory system capable of routing data between multiple first ones of the ports and multiple second ones of the ports in parallel; and A still further object of the invention is to provide a memory system for use in performing multiple memory read and write operations in parallel, and wherein each memory read and write operation includes the transfer of a block of data signals.

SUMMARY OF THE INVENTION

The objectives of the present invention are achieved in a modular multi-port main memory system that is capable of performing multiple memory operations simultaneously. The main memory system includes an expandable number of memory sub-units wherein each of the sub-units is mapped to a portion of the total address space of the main memory system, and may be accessed simultaneously. Multiple point-to-point interconnections are provided within the main memory system to allow each one of the multiple memory ports to be interconnected simultaneously to a different one of the memory sub-units. The capacity of the main memory system may be incrementally expanded by adding sub-units, additional point-to-point interconnections, and additional memory ports. This allows memory bandpass to increase as the processing power of a system grows.

The basic building block of the modular main memory system is the Memory Storage Unit (MSU). The main memory system of the preferred embodiment may be expanded to include up to four MSUs. Each MSU includes multiple memory ports, and an expandable number of memory sub-units called Memory Clusters. The MSU of the preferred embodiment includes four memory ports, and up to four Memory Clusters. Each of the Memory Clusters includes an expandable number of memory sub-units called MSU Expansion Units, wherein each of MSU Expansion Units is adaptable to receive a user-selectable amount of memory. Each of the Memory Clusters of -the preferred embodiment includes between one and four MSU Expansion Units, and each MSU Expansion Unit may include between 128 and 512 Megabytes of storage. Thus the main memory system of the current invention includes a minimum of one MSU Expansion Unit having 128 Megabytes, and is incrementally expandable as dictated by user requirements to sixty-four MSU Expansion Units with a total capacity of 32 Gigabytes. This expansion capability provides a system that is highly flexibly,. and may be easily adapted to changing processing requirements.

In operation, an MSU receives a read or a write request from a unit coupled to one of the four memory ports. The request is accepted by an MSU if an associated request address maps to the address range associated with one of the Memory Clusters included in that MSU. The request address and any associated data may be queued, and is eventually routed via a point-to-point switching network to the correct MSU Expansion Unit within the correct Memory Cluster. In the case of a memory write operation, the queued data is written to memory and the operation is considered completed. In the case of a memory read operation, data is returned from the MSU Expansion Unit, may be queued, and is eventually returned to the correct memory port via the point-to-point switching network.

Each MSU is designed to perform multiple data transfer operations in parallel. Each MSU is capable of receiving data signals from, or providing data signals to, each of the four memory ports in parallel. While the MSU is performing the memory port transfer operations, unrelated data transfer operations may be in progress simultaneously to all of the Memory Clusters. Thus, a fully populated MSU may be performing up to eight unrelated data transfer operations simultaneously. Furthermore, within each MSU, each of the four MSU Expansion Units within each of the four Memory Clusters may be performing memory operations in parallel so that sixteen unrelated memory operations are occurring simultaneously. A fully populated main memory system including four MSUs has four times this capacity.

Besides providing a memory system capable of highly parallel operations, the bandpass is increased by providing interfaces capable of performing high-speed block transfer operations. Within the preferred embodiment, data is transferred in sixty-four byte blocks called cache lines. Each of the four memory ports, and each of the four MSU Expansion interfaces transfers data in parallel at the rate of 1.6 gigabytes/second. Therefore, within a single MSU, 12.8 gigabytes/second may be in transit at any given instant in time. A fully expanded main memory system containing four MSUs may transfer 51.2 gigabytes/second.

The main memory system solves the memory coherency problem by providing additional storage for supporting a directory-base coherency protocol. That is, a storage array within each of the MSU Expansion Units stores directory state information that indicates whether any cache line has been copied to, and/or updated within, a cache memory coupled to the main memory system. This directory state information, which is updated during any memory operation, is used to ensure memory operations are always performed on the most recent copy of the data. For example, when an MSU receives a request for particular cache line, and the directory state information indicates an updated copy of the cache line resides within one of the cache memories, the MSU causes the updated cache line to be returned to the MSU. The updated data is then routed to the requesting processor via a high-speed point-to-point interconnect within the MSU, and is further stored within the correct MSU Expansion Unit. Such "Return" operations, as they are called, may be initiated to all ports within an MSU substantially simultaneously.

The modular main memory system described herein therefore solves the problems associated with shared main memories of prior art multi-processor systems. The modular memory is extremely flexible, and may be incrementally expanded to accommodate a wide range of user requirements. The system may therefore by tailored to exact user specifications without adding the expense of unnecessary hardware. Additionally, the multi-port structure, independently operational MSU Expansion Units, and the multiple, expandable, point-to-point interconnections provide a highly parallel structure capable of meeting the bandpass requirements of a high-speed processing system. Finally, the directory-based coherency system, which is incorporated within each of the MSU Expansion Units, provides a coherency mechanism that is likewise flexible, and may expand as processing demands increases.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description tare to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

System Platform

Figure 1:
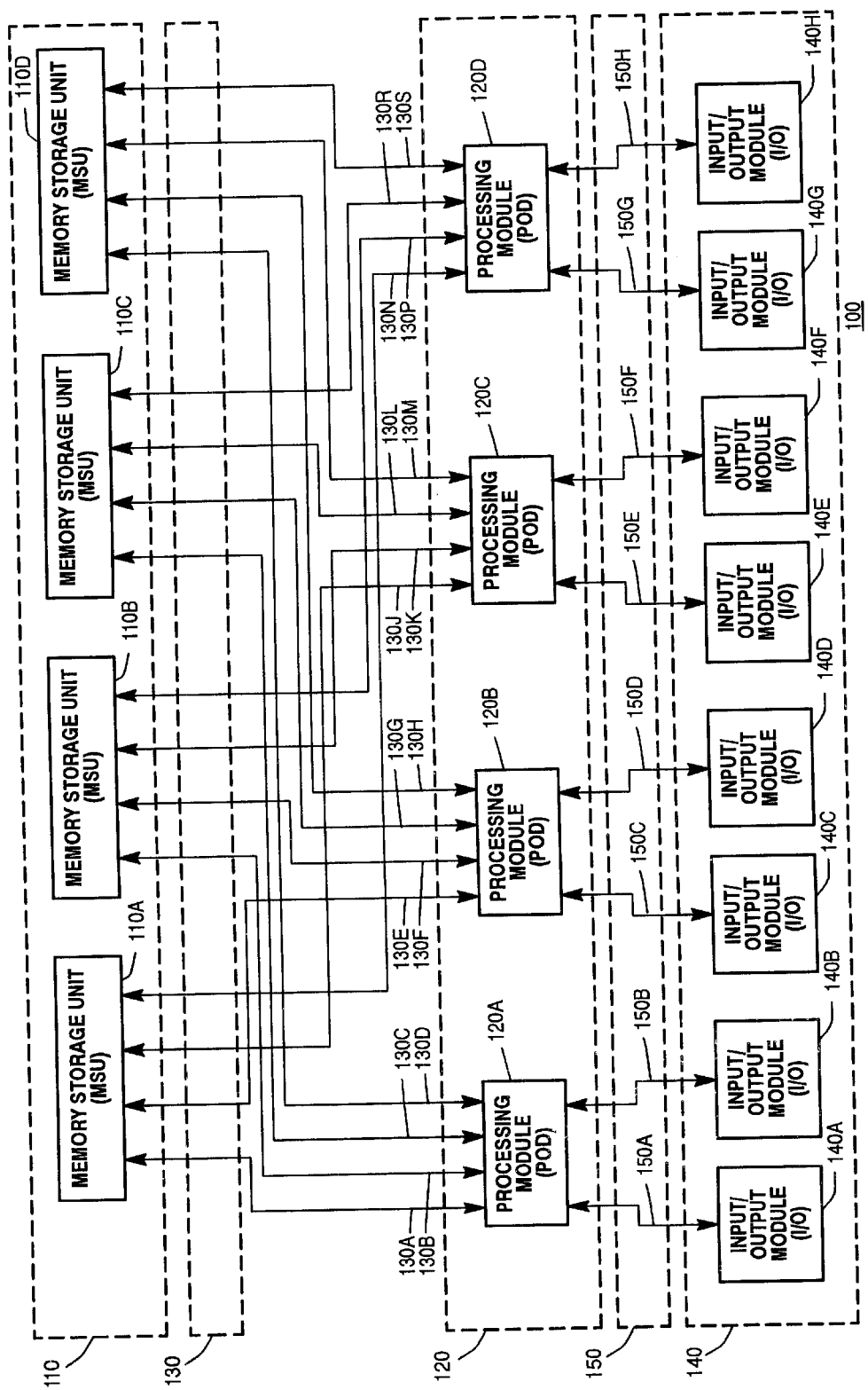
FIG. 1 is a block diagram of a Symmetrical MultiProcessor (SMP) system platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A. interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bi-directional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2×SYSCLK). In a preferred embodiment of the present invention, the system clock frequency is 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are-similar to the MI Interfaces 130, but in the preferred embodiment have a transfer rate that is approximately half the transfer rate of the Ml Interfaces because the I/O Modules 140 are located at a greater distance from the PODs 120 than are the MSUs 110. The I/O Modules 140 will be discussed further below.

Processing Module (POD)

Figure 2:
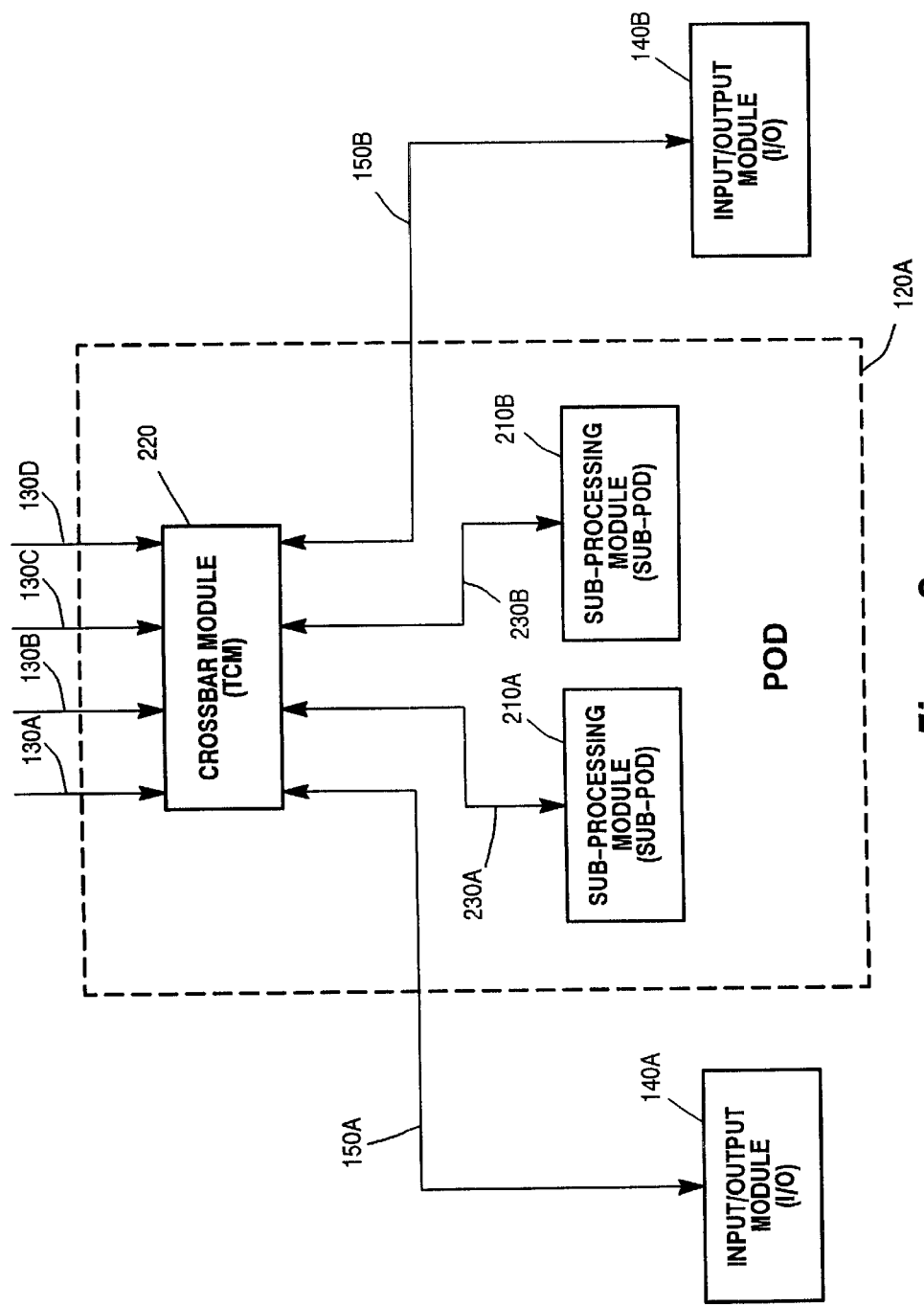
FIG. 2 is a block diagram of a Processing Module (POD) according to one embodiment of the present invention.

FIG. 2 is a block diagram of a processing module (POD) according to one embodiment of the present invention. POD 120A is shown, but each of the PODs 120A through 120D have a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Interfaces 230A and 230B, respectively, that are similar to the MI interconnections 130. TCM 220 further interconnects to one or more I/O Modules 140. via the respective point-to-point MIO Interfaces 150. TCM 220 both buffers data and functions as a switch between Interfaces 230A, 230B, 150A, and 150B, and MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. According to one embodiment of the current system platform, the TCM 220 can further be configured to perform address interleaving functions to the various MSUs. The TCM may also be utilized to perform address translation functions that are necessary for ensuring that each processor (not shown in FIG. 2) within each of the Sub-PODs 210 and each I/O Module 140 views memory as existing within a contiguous address space as is required by certain off-the-shelf operating systems.

In one embodiment of the present invention, I/O Modules 140 are external to Sub-POD 210 as shown in FIG. 2. This embodiment allows system platform 100 to be configured based on the number of I/O devices used in a particular application. In another embodiment of the present invention, one or more I/O Modules 140 are incorporated into Sub-POD 210. I/O Modules 140 are discussed in further detail below.

I/O Module

Figure 3:
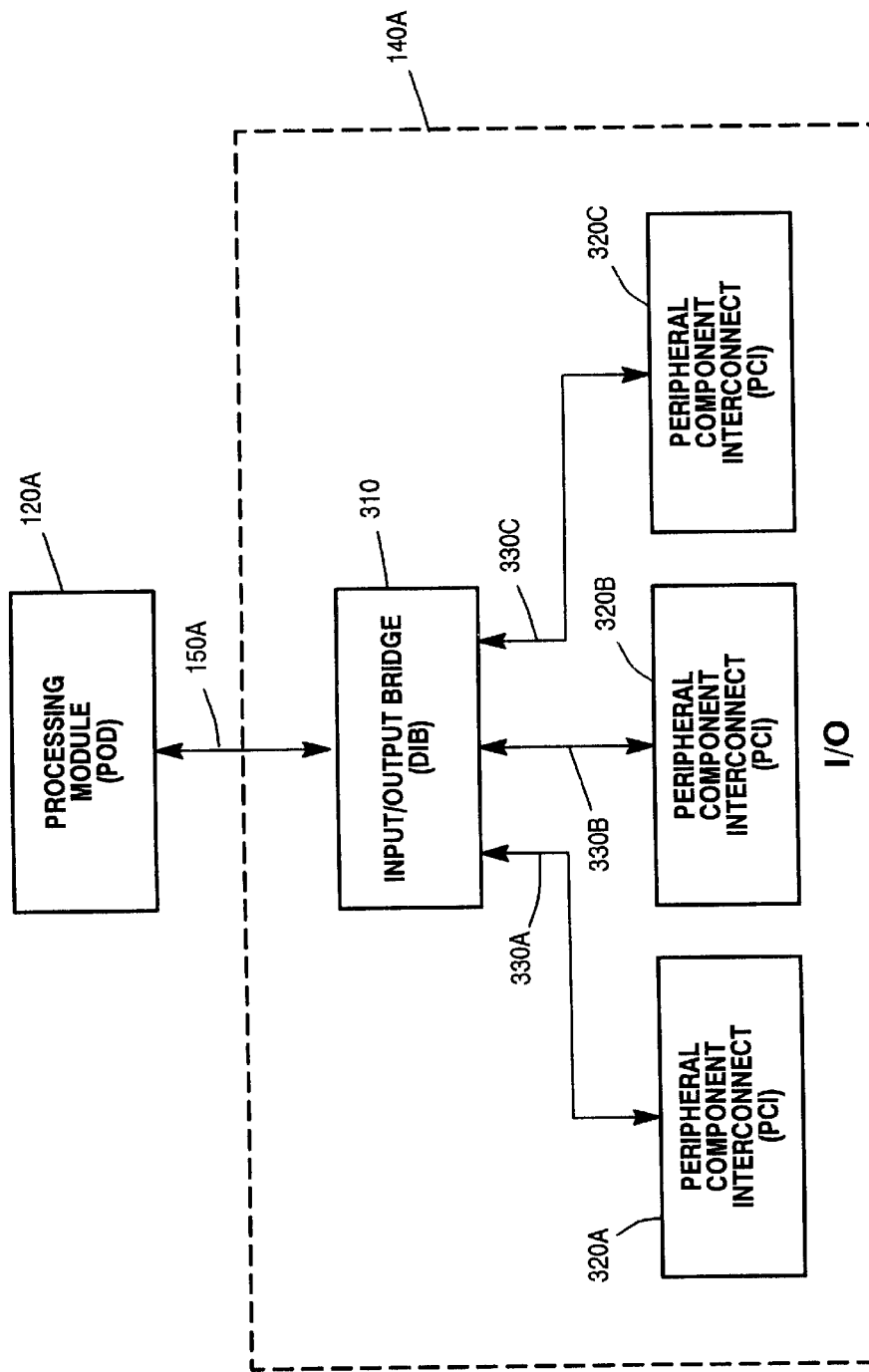
FIG. 3 is a block diagram of an I/O Module according to one embodiment of the present invention.

FIG. 3 is a block diagram of an I/O Module according to one embodiment of the present invention. I/O Module 140A and Processing Module 120A are illustrated, but it is understood that each I/O Module 140 has a similar structure and interconnection. I/O Module 140A includes a Direct Input/Output Bridge (DIB) 310 connected to one or more Peripheral Component Interconnects (PCI) 320 (shown as PCI 320A, PCI 320B, and PCI 320C) via a dedicated PCI Interface 330 (shown as PCI Interfaces 330A, 330B, and 330C, respectively). DIB 310 is also connected to POD 120A via MIO Interface 150A as is shown in FIG. 2. DIB 310 buffers data and functions as a switch between PCI Interfaces 330A, 330B, and 330C and MIO Interface 150A, allowing POD 120A access to each of PCIs 320A, 320B, and 320C, respectively.

Peripheral Component Interconnect (PCI) 320 is a set of industry standard PCI add-in cards that connect various I/O devices (not shown) to I/O Module 140A via an industry-standard bus. These devices include, but are not limited to, SCSI controllers, LAN controllers, and video controllers.

Sub-Processing Module

Figure 4:
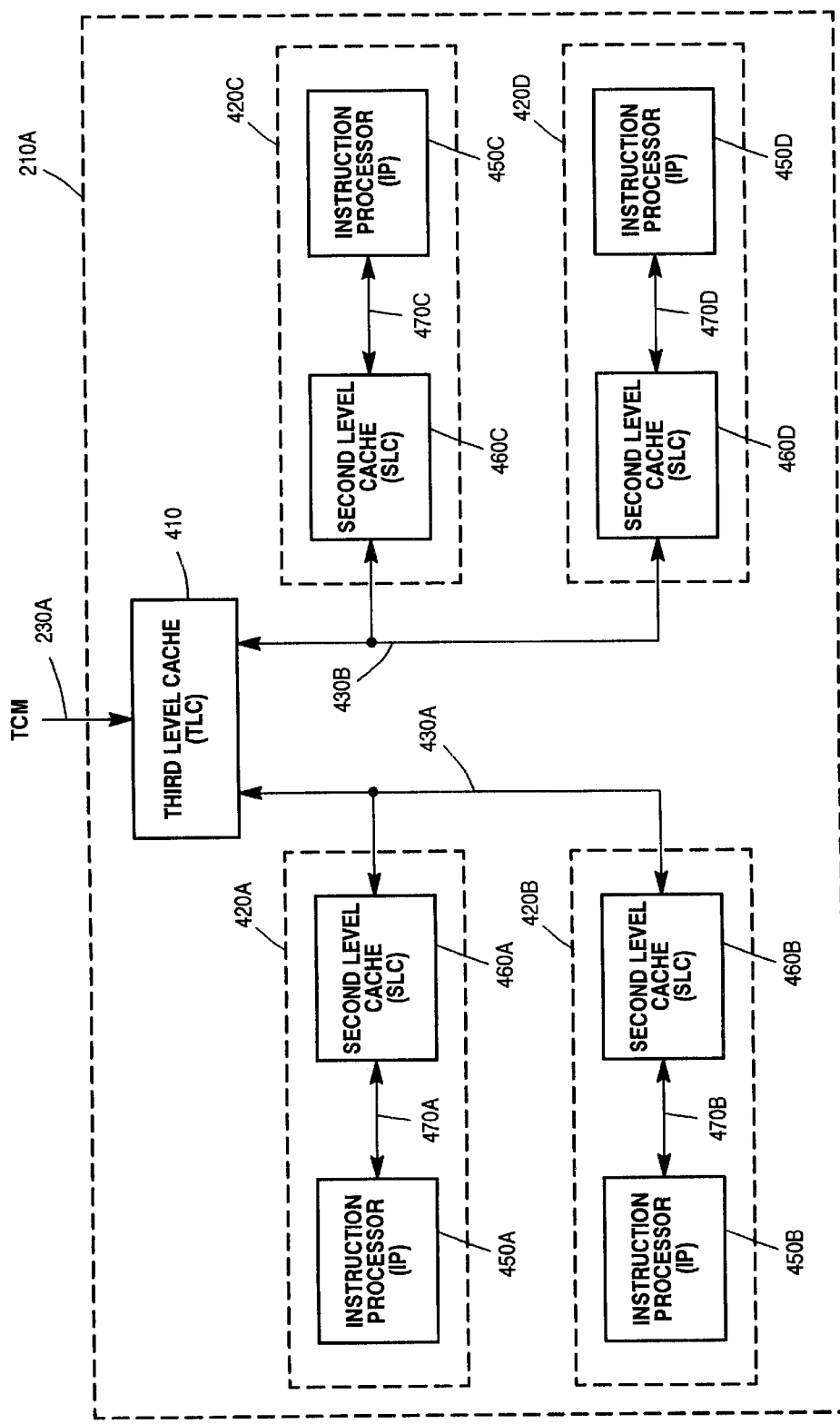
FIG. 4 is a block diagram of a Sub-Processing Module (Sub-POD) according to one embodiment of the present invention.

FIG. 4 is a block diagram of a Sub-Processing Module (Sub-POD) according to one embodiment of the present invention. Sub-POD 210A is shown, but it is understood that all Sub-PODs 210 have similar structures and interconnections. In this embodiment, Sub-POD 210A includes a Third-Level Cache (TLC) 410 and one or more Coherency Domains 420 (shown as Coherency Domains 420A, 420B, 420C, and 420D). TLC 410 is connected to Coherency Domains 420A and 420B via Bus 430A, and is connected to Coherency Domains 420C and 420D via Bus 430B. TLC 410 caches data from the MSU, and maintains data coherency among all of Coherency Domains 420, guaranteeing that each processor is always operating on the latest copy of the data.

Each Coherency Domain 420 includes an Instruction Processor (IP) 450 (shown as IPs 450A, 450B, 450C, and 450D), and a Second-Level Cache (SLC) 460 (shown as SLC 460A, 460B, 460C and 460D.) Each SLC interfaces to an IP via a respective point-to-point Interface 470 (shown as Interfaces 470A, 470B, 470C, and 470D), and each SLC further interfaces to the TLC via Bus 430 (shown as 430A and 430B.) For example, SLC 460A interfaces to IP 450A via Interface 470A and to TCL 410 via Bus 430A. Similarly, SLC 460C interfaces to IP 450C via Interface 470C and to TCL 410 via Bus 430B. Each SLC caches data from the TLC as requested by the interconnecting IP 450.

In the preferred embodiment, each of the Interfaces 470 is similar to the MI Interfaces 130, but each of the Interfaces 470 has a transfer rate which is approximately twenty-five percent higher than the transfer rate of each of the MI Interfaces. This difference in transfer rates creates an asynchronous boundary between Interfaces 470 and the MI Interfaces 130. This asynchronous boundary is managed by staging registers in the TCM 220.

IP 450 and SLC 460 may be integrated in a single device, such as in an Pentium Pro® Processing device available from the Intel Corporation. Alternatively, the IP 450 may be a A-Series Instruction Processor or a 2200-Series Instruction Processor, both commercially available from the Unisys Corporation. In this embodiment, the IP 450 is externally coupled to an SLC 460.

In the preferred embodiment, IP 450 includes an internal First Level Cache. For example, a Pentium Pro® Processing device available from the Intel Corporation includes an internal FLC as well as an SLC. In other embodiments of the present invention, IPs 450 may each utilize an external FLC or not include an FLC at all. Furthermore, in other embodiments of the present invention, each Coherency Domain 420 may includes more successive levels of cache so that multiple caches exist between TLC 410 and IP 450.

Figure 5:
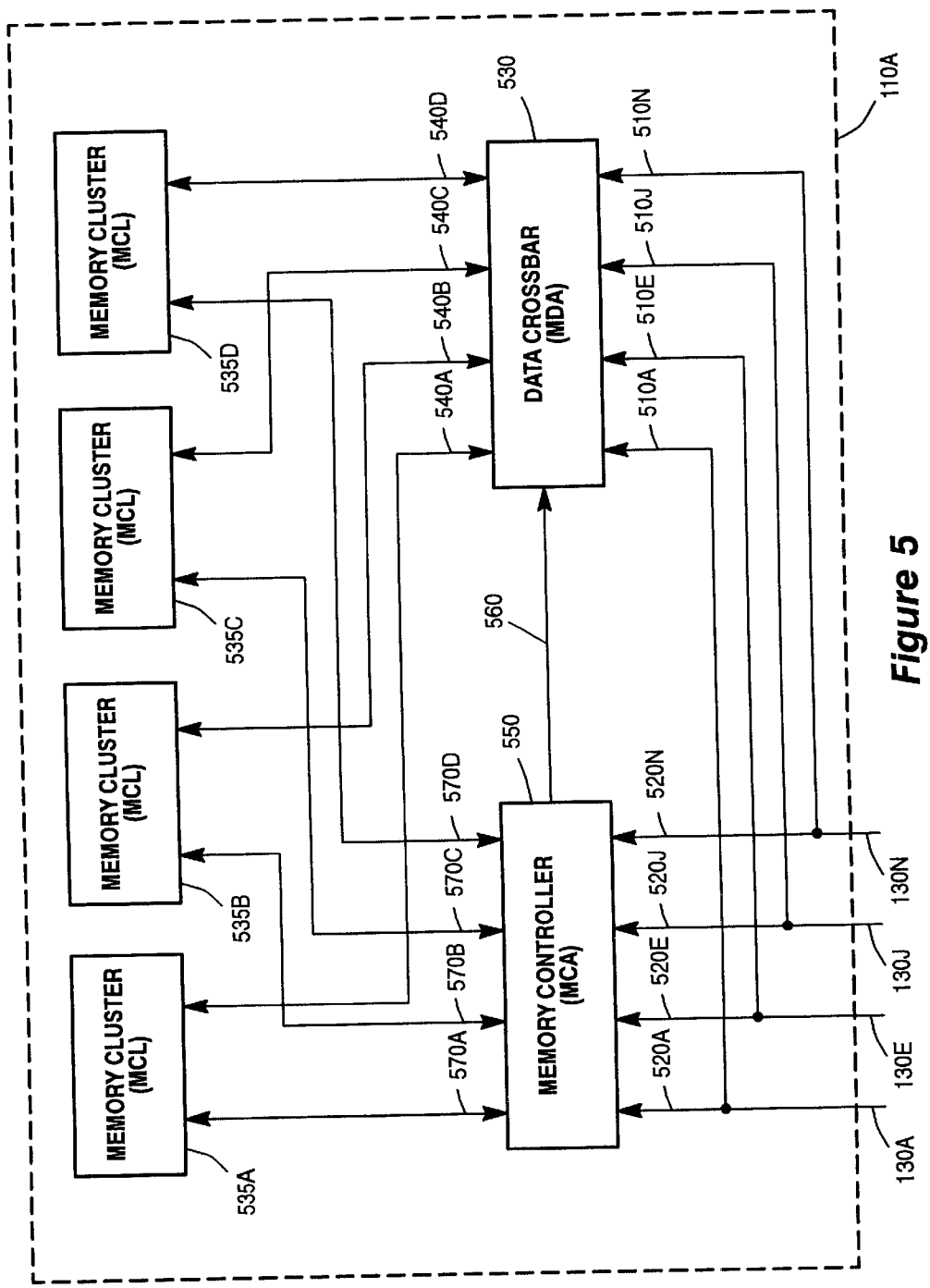
FIG. 5 is a block diagram of a Memory Storage Unit (MSU)

FIG. 5 is a block diagram of a Memory Storage Unit (MSU) 110. Although MSU 110A is shown and discussed, it is understood that this discussion applies equally to each of the MSUs 110. As discussed above, MSU 110A interfaces to each of the: PODs 120A, 120B, 120C, and 120D across dedicated point-to-point MI Interfaces 130A, 130E, 130J, and 130N, respectively. Each MI Interface 130 contains Data Lines 510 (shown as 510A, 510E, 510J, and 510N) wherein each set of Data Lines 510 includes sixty-four bi-directional data bits, data parity bits, data strobe lines, and error signals (not individually shown.) Each set of Data Lines 510 is therefore capable of transferring eight bytes of data at one time. In addition, each MI Interface 130 includes bi-directional Address/command Lines 520 (shown as 520A, 520E, 520J, and 520N.) Each set of Address/command Lines 520 includes bi-directional address signals, a response signal, hold lines, address parity, and early warning and request/arbitrate lines.

A first set of unidirectional control lines from a POD to the MSU are associated with each set of the Data Lines 510, and a second set of unidirectional control lines from the MSU to each of the PODs are further associated with the Address/command Lines 520. Because the Data Lines 510 and the Address/command Lines 520 each are associated with individual control lines, the Data and Address information may be transferred across the MI Interfaces 130 in a split transaction mode. In other words, the Data Lines 510 and the Address/command Lines 520 are not transmitted in a lock-step manner.

In the preferred embodiment, the transfer rates of the Data Lines 510 and Address/control Lines 520 are different, with the data being transferred across the Data Lines at rate of approximately 200 Mega-Transfers per Second (MT/S), and the address/command information being transferred across the Address/command Lines at approximately 100 MT/S. During a typical data transfer, the address/command information is conveyed in two transfers, whereas the associated data is transferred in a sixty-four-byte packet called a cache line that requires eight transfers to complete. The difference between data and address transfer rates and transfer lengths will be discussed further below.

Returning now to a discussion of FIG. 5, the Data Lines 510A, 510E, 510J, and 510N interface to the Memory Data Crossbar (MDA) 530. The MDA 530 buffers data received on Data Lines 510, and provides the switching mechanism that routes this data between the PODs 120 and an addressed one of the storage sub-units called Memory Clusters (MCLs) 535 (shown as 535A, 535B, 535C, and 535D.) Besides buffering data to be transferred from any one of the PODs to any one of the MCLs, the MDA 530 also buffers data to be transferred from any one of the PODs to any other one of the PODs in a manner to be discussed further below. Finally, the MDA 530 is capable of receiving data from any one of the MCLs 535 on each of Data Buses 540 for delivery to any one of the PODs 120.

In the preferred embodiment, the MDA 530 is capable of simultaneously receiving data from one or more of the MI Interfaces 130 while simultaneously providing data to all of the other MI Interfaces 130. Each of the MI Interfaces is capable of operating at a transfer rate of 64 bits every five nanoseconds (ns), or 1.6 gigabytes/second for a combined transfer rate across four interfaces of 6.4 gigbytes/second. The MDA 530 is further capable of transferring data to, or receiving data from, each of the MCLs 535 across Data Buses 540 at a rate of 128 bits every 10 ns per Data Bus 540, for a total combined transfer rate across all Data Buses 540 of 6.4 gigabytes/seconds. Data Buses 540 require twice as long to perform a single data transfer operation (10 ns versus 5 ns) as compared to Data Lines 510 because Data Buses 540 are longer and support multiple loads (as is discussed below). It should be noted that since the MDA is capable of buffering data received from any of the MCLs and any of the PODs, up to eight unrelated data transfer operations may be occurring to and/or from the MDA at any given instant in time. Therefore, as mention above, the MDA is capable of routing data at a combined peak transfer rate of 12.8 gigabytes/second.

Control for the MDA 530 is provided by the Memory Controller (MCA) 550. MCA queues memory requests, and provides timing and routing control information to the MDA across Control. Lines 560. The MCA 550 also buffers address, command and control information. received on Address/command lines 520A, 520E, 520J, and 520N, and provides request addresses to the appropriate memory device across Address Lines 570 (shown as 570A, 570B, 570C, and 570D) in a manner to be described further below. As discussed above, for operations that require access to the MCLs 535, the address information determines which of the MCLs 535 will receive the memory request. The command information indicates which type of operation is being performed. Possible commands include Fetch, Flush, Return, I/O Overwrite, and a Message Transfer, each of which will be described below. The control information provides timing and bus arbitration signals which are used by distributed state machines within the MCA 550 and the PODs 120 to control the transfer of data between the PODs and the MSUs. The use of the address,.command, and control information will be discussed further below.

As mentioned above, the memory associated with MSU 110A is organized into up to four Memory Clusters (MCLs) shown as MCL 535A, MCL 535B, MCL 535C, and MCL 535D. However, the MSU may be populated with as few as one MCL if the user so desires. Each MCL includes arrays of Synchronous Dynamic Random Access memory (SDRAM) devices and associated drivers and transceivers. MCL 535A, 535B, 535C, and 535D is each serviced by one of the independent bi-directional Data Buses 540A, 540B, 540C, and 540D, respectively, where each of the Data Buses 540 includes 128 data bits. Each MCL 535A, 535B, 535C, and 535D is further serviced by one of the independent set of the Address Lines 570A, 570B, 570C, and 570D, respectively.

In the preferred embodiment, an MCL 535 requires 20 clock cycles,. or 200 ns, to complete a memory operation involving a cache line of data. In contrast, each of the Data Buses 540 are capable of transferring a 64-byte cache line of data to/from each of the MCLs 535 in five bus cycles, wherein each bus cycle corresponds to one clock cycle. This five-cycle transfer includes one bus cycle for each of the four sixteen-byte; data transfer operations associated with a 64-byte cache line, plus an additional bus cycle to switch drivers on the bus. To resolve the discrepancy between the faster transfer rate of the Data Buses 540 and the slower access rate to the MCLs 535, the system is designed to allow four memory requests to be occurring simultaneously but in varying phases of completion to a single MCL 535. To allow this interlacing of requests to occur, each set of Address Lines 570 includes two address buses and independent control lines as discussed below in reference to FIG. 6.

Directory Coherency Scheme of the Preferred Embodiment

Before discussing the memory structure in more detail, the data coherency scheme of the current system is discussed. Data coherency involves ensuring that each POD 120 operates on the latest copy of the data. Since multiple copies of the same data may exist within platform memory, including the copy in the MSU and additional copies in various local cache memories (local copies), some scheme is needed to control which data copy is considered the "latest" copy. The platform of the current invention uses a directory protocol to maintain data coherency. In a directory protocol, information associated with the status of units of data is stored in memory. This information is monitored and updated by a controller when a unit of data is requested by one of the PODs 120. In one embodiment of the present invention, this information includes the status of each 64-byte cache line. The status is updated when access to a cache line is granted to one of the PODs. The status information includes a vector which indicates the identity of the POD(s) having local copies of the cache line.

In the present invention, the status of the cache line includes "shared" and "exclusive." Shared status means that one or more PODs have a local copy of the cache line for read-only purposes. A POD having shared access to a cache line may not update the cache line. Thus, for example, PODs. 120A and 120B may have shared access to a cache line such that a copy of the cache line exists in the Third-Level Caches 410 of both PODs for read-only purposes.

In contrast to shared status, exclusive status, which is also referred to as exclusive ownership, indicates that a only one POD "owns" the cache line. A POD must gain exclusive ownership of a cache line before data within the cache line may. be modified. When a POD has exclusive ownership of a cache line, no other POD may have a copy of that cache line in any of its associated caches.

Before a POD can gain exclusive ownership of a cache line, any other PODs having copies of that cache line must complete any in-progress operations to that cache line. Then, if one or more POD(s) have shared access to the cache line, the POD(s) must designate their local copies of the cache line as invalid. This is known as a Purge operation. If, on the other hand, a single POD has exclusive ownership of the requested cache line, and the local copy has been modified, the local copy must be returned to the MSU before the new POD can gain exclusive ownership of the cache line. This is known as a "Return" operation, since the previous exclusive owner returns the cache line to the MSU so it can be provided to the requesting POD, which becomes the new exclusive owner. In addition, the updated cache line is written to the MSU sometime after the Return operation has been performed, and the directory state information is updated to reflect the new status of the cache line data. In the case of either a Purge or Return operation, the POD(s) having previous access rights to the data may no longer use the old local copy of the cache line, which is invalid. These POD(s) may only access the cache line after regaining access rights in the manner discussed above.

In addition to Return operations, PODs also provide data to be written back to an MSU during Flush operations as follows. When a POD receives a cache line from an MSU, and the cache line is to be copied to a cache that is already full, space must be allocated in the cache for the new data. Therefore, a predetermined algorithm is used to determine which older cache line(s) will be disposed of, or "aged out of" cache to provide the amount of space needed for the new information. If the older data has never been modified, it may be merely overwritten with the new data. However, if the older data has been modified, the cache line including this older data must be written back to the MSU 110 during a Flush Operation so that this latest copy of the data is preserved.

Data is also written to an MSU 110 during I/O Overwrite operations. An I/O Overwrite occurs when one of the I/O Modules 140 issues an I/O Overwrite command to the MSU. This causes data provided by the I/O Module to overwrite the addressed data in the MSU. The Overwrite operation is performed regardless of which other PODs have local copies of the data when the Overwrite operation is performed. The directory state information is updated to indicate that the affected cache line(s) is "Present" in the MSU, meaning the MSU has ownership of the cache line and no valid copies of the cache line exist anywhere else in the system.

In addition to having ownership following an Overwrite operation, the MSU is also said to have ownership of a cache line when the MSU has the most current copy of the data and no other agents have a valid local copy of the data. This could occur, for example, after a POD having exclusive data ownership performs a Flush operation of one or more cache lines so that the MSU thereafter has the only valid copy of the data.

Memory Clusters

Figure 6:
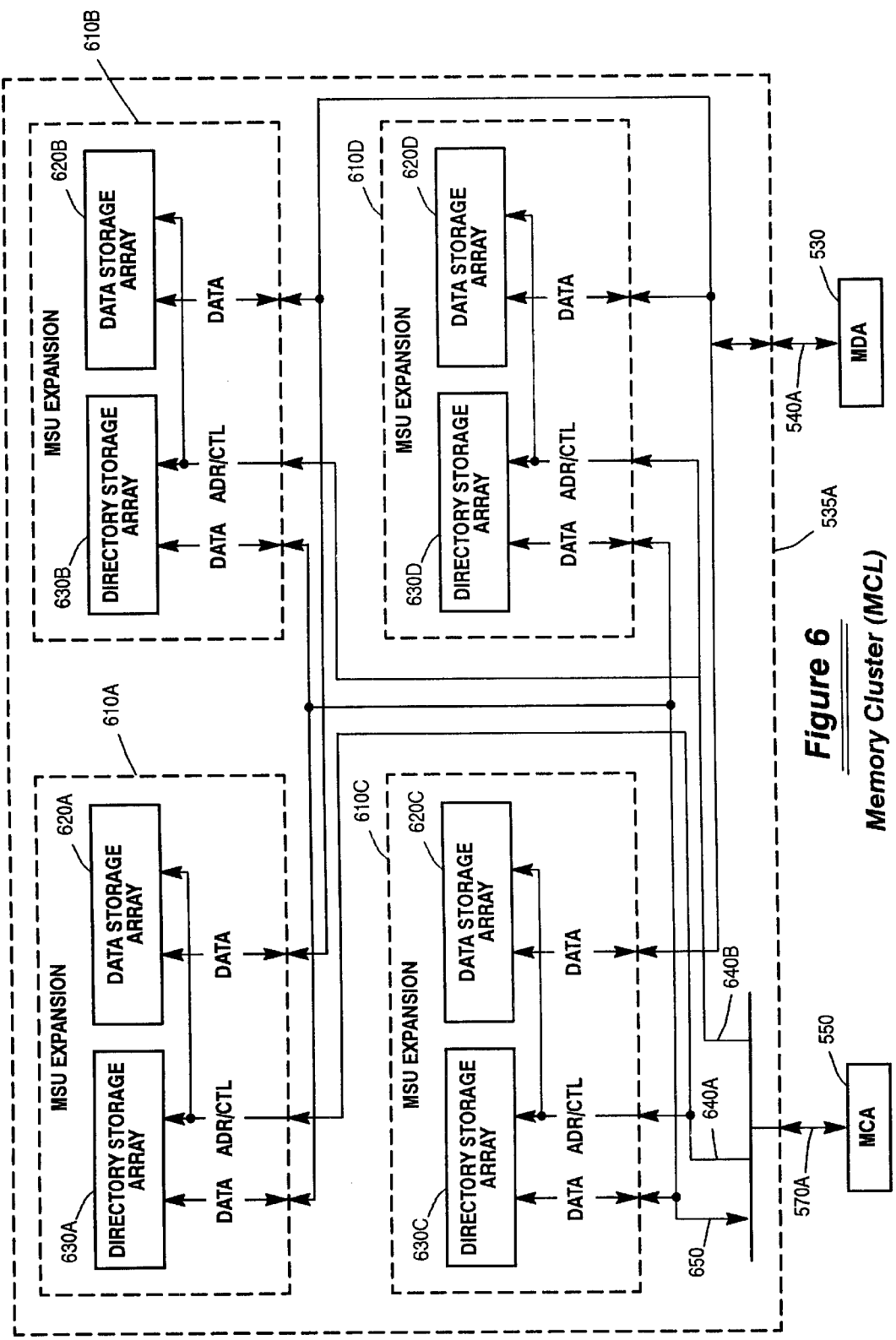
FIG. 6 is a block diagram of a Memory Cluster (MCL)

FIG. 6 is a block diagram of a Memory Cluster (MCL) 535A. Although MCL 535A is shown and described, the following discussion applies equally to all MCLs 535. An MCL contains between one and four MSU Expansions 610A, 610B, 610C, and 610D as dictated by user needs. A minimally-populated MSU 110 will contain at least one MSU Expansion 610. Each MSU Expansion 610 includes two Dual In-line Memory Modules (DIMMs, not individually shown). Since a fully populated MSU 110 includes up to four MCLs 535, and a fully populated MCL includes up to four MSU Expansions, a fully populated MSU 110 includes up to 16 MSU Expansions 610 and 32 DIMMs. The DIMMs can be populated with various sizes of commercially available SDRAMs as determined by user needs. In the preferred embodiment, the DIMMs are populated with either 64 Mbyte, 128 Mbyte, or 256 Mbyte SDRAMs. Using the largest capacity DIMM, the MSU 110 of the preferred embodiment has a maximum capacity of eight gigabytes of data storage, or 32 gigabytes of data storage in a SMP Platform 100 having four MSUs. Additional storage is provided for the directory state information, and parity and error bits to be discussed below.

Each MSU Expansion 610 contains two arrays of logical storage, Data Storage Array 620 (shown as 620A, 620B, 620C, and 620D) and Directory Storage Array 630 (shown as 630A, 630B, 630C, and 630D.) MSU Expansion 610A includes Data Storage Array 620A and Directory Storage Array 630A, and so on.

Each Data Storage Array 620 is 128 data bits wide, and further includes 28 check bits, and four error bits (not individually shown.) This information is divided into four independent Error Detection and Correction (ECC) fields, each including 32 data bits, seven check bits, and an error bit. An ECC field provides Single Bit Error Correction (SBEC), Double Bit Error Detection (DED), and guarantees error detection within a field of any four adjacent data bits. Since each Data Storage Array 620 is composed of SDRAM devices which are each eight data bits wide, full device failure detection can be ensured by splitting the eight bits from each SDRAM device into separate ECC fields.

Each of the Data Storage Arrays 620 interfaces to the bi-directional Data Bus 540A which also interfaces with the MDA 530. Each of the Data Storage Arrays further receives selected ones of the unidirectional Address Lines 570A driven by the MCA 550. As discussed above, each of the Address Lines 570A includes two Address Buses 640 (shown as 640A and 640B), one for each pair of MSU Expansions 610: Data Storage Arrays 620A and 620C receive Address Bus 640A, and Data Storage Arrays 620B and 620D receive Address Bus 640B. This dual address bus structure allows multiple memory transfer operations to be occurring simultaneously to each of the Data Storage Arrays within an MCL 535, thereby allowing the slower memory access rates to more closely match the data transfer rates achieved on Data Buses 540. This will be discussed further below.

Each addressable storage location within the Directory Storage Arrays 630 contains nine bits of directory state information and five check bits for providing single-bit error correction and double-bit error detection on the directory state information. The directory state information includes the status bits, used to maintain -the directory coherency scheme discussed above. Each of the Directory Storage Arrays is coupled to one of the Address Buses 640 from the MCA 550. Directory Storage Arrays 630A and 630C are coupled to Address Bus 640A, and Directory Storage Arrays 630B and 630D are coupled to Address Bus 640B. Each of the Directory Storage Arrays further receive a bi-directional Directory Data Bus 650, which is included in Address Lines 570A, and which is used to update the directory state information.

The Data Storage Arrays 620 provide the main memory for the SNP Platform. During a read of one of the Data Storage Arrays 620 by one of the Sub-PODs 210 or one of the I/O modules 140, address signals and control lines are presented to a selected MSU Expansion 610 in the timing sequence required by the commercially-available SDRAMs populating the MSU Expansions. The MSU Expansion is selected based on the request address. After a fixed delay, the Data Storage Array 620 included within the selected MSU Expansion 610 provides the requested cache line during a series of four 128-bit data transfers, with one transfer occurring every 10 ns. After each of the transfers, each of the SDRAMs in the Data Storage Array 620 automatically increments the address internally in predetermined fashion. At the same time, the Directory Storage Array 630 included within the selected MSU Expansion 610 performs a read-modify-write operation. Directory state information associated with the addressed cache line is provided from the Directory Storage Array across the Directory Data Bus 650 to the MCA 550. The MCA updates the directory state information and writes it back to the Directory Storage Array in a manner to be discussed further below.

During a memory write operation, the MCA 550 drives Address Lines 640 to the one of the MSU Expansions 610 selected by the request address. The Address Lines are driven in the timing sequence required by the commercially-available SDRAMs populating the MSU Expansion 610. The MDA 530 then provides the 64 bytes of write data to the selected Data Storage Array 620 using the timing sequences required by the SDRAMs. Address incrementation occurs within the SDRAMs in a similar manner to that described above.

Data Crossbar

Figure 7:
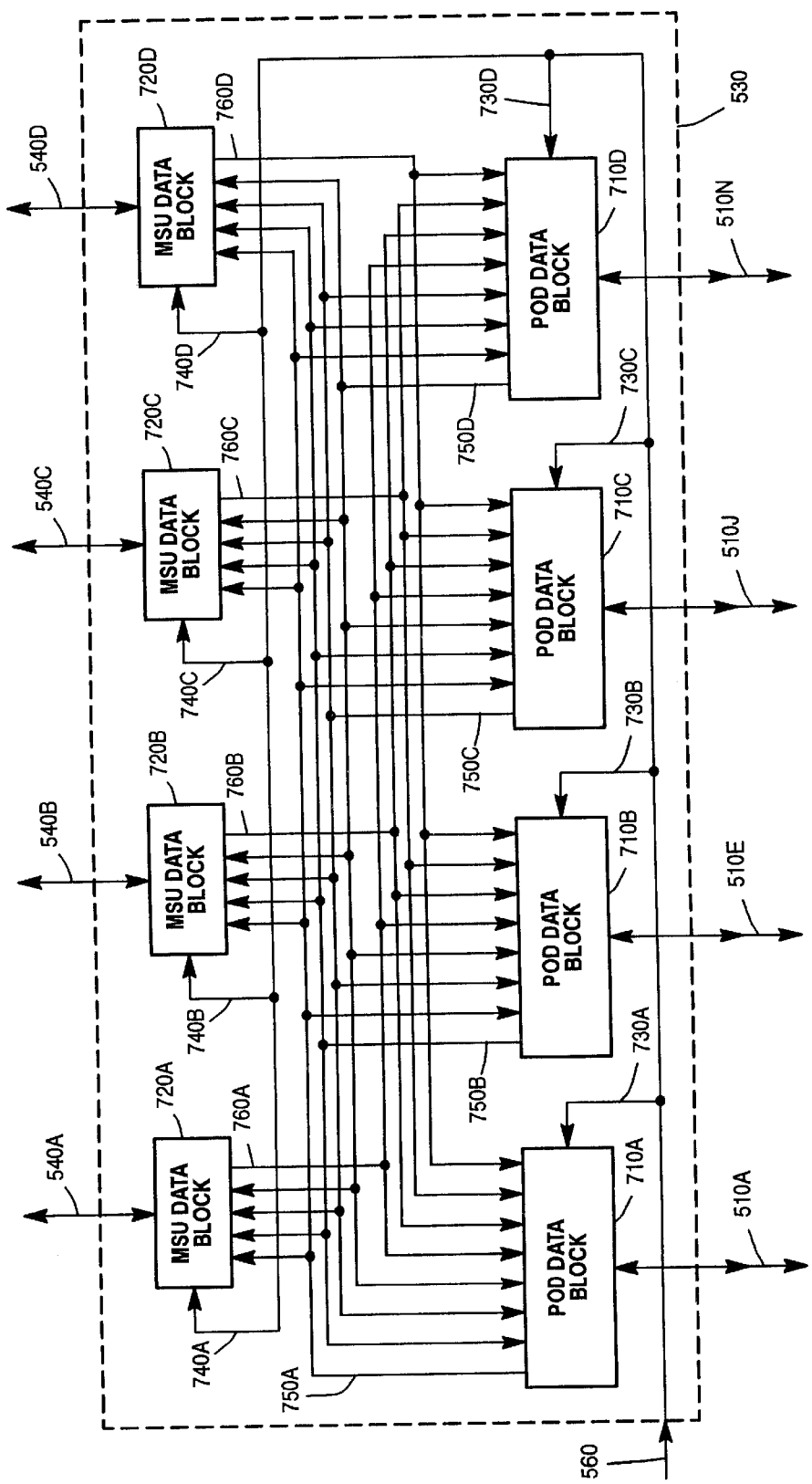
FIG. 7 is a block diagram of the Data Crossbar (MDA)

FIG. 7 is a block diagram of the Data Crossbar (MDA) 530. Although MDA 530 of MSU 110A is shown and discussed, this discussion applies equally to all MDAs 530 in the system. POD Data Blocks 710, shown as POD Data Blocks 710A, 710B, 710C, and 710D interface to PODs 120A, 120B, 120C, and 120D, respectively, over Data Lines 510A, 510E, 510J, and 510N, respectively. POD Data Blocks 710 buffer the data sent to, and received from, the respective one of the PODs 120. MDA 530 further includes MSU Data Blocks 720A, 720B, 720C, and 720D, which are interconnected to MCLs 535A, 535B, 535C, and 535D over Data Buses 540A, 540B, 540C, and 540D, respectively.

MSU Data Blocks 720 buffer the data sent to, and received from, the respective MCL 535. The MCA 550 provides the control for the POD Data Blocks 710 and the MSU Data Blocks 720 on Control Line 560. Control Line 560 includes independent control lines to each of the POD Data Blocks 710 (shown as POD Data Block Control Lines 730A, 730B, 730C, and 730D) so that each POD Data Block 710 can run in parallel. Control line 560 further includes independent control lines to each of the MSU Data Blocks (shown as MSU Data Block Control Lines 740A, 740B, 740C, and 740D) so that each MSU Data Block 720 can run in parallel.

Each POD Data Block 710 drives all of the MSU Data Blocks 720 and all other POD Data Blocks 710 on Lines 750 (shown as 750A, 750B, 750C, and 750D) with two independent 128-bit sets of data signals (not individually shown). For example, POD Data Block 710A drives Line 750A, which includes two independent 128-bit sets of data signals that are each driven to each-of the MSU Data Blocks 720, and to each of the other POD Data Blocks 710. Each of the independent 128-bit sets of data signals included in each of Lines 750 are unidirectional and are used to transfer updated memory data to a selected one of the MSU Data Blocks 720 during a Return, Flush, or I/O Overwrite Operation. Each of the sets of data signals on Lines 750 also transfers message data or an updated cache line from one POD 120 to an another POD during Message or Return Operations, respectively.

Each MSU Data Block 720. drives all of the POD Data Blocks 710 on Lines 760 (shown as 760A, 760B, 760C, and 760D). Each of Lines 760 include two independent 128-bit sets of data signals that drive each of the POD Data Blocks 710. For example, MSU Data Block 720A drives Line-760A, which includes two independent 128-bit sets of data signals that are each driven to each of the POD Data Blocks 710. Each of the independent 128-bit sets of data signals included in each of Lines 750 are unidirectional and are used to transfer data from the MCLs 535 to the PODs 120 during read operations when the directory state information associated with the addressed cache line indicates the cache line is "Present" in the MSU, indicating that the most recent copy of the data is owned by the MSU 110.

POD Data Block

Figure 8:
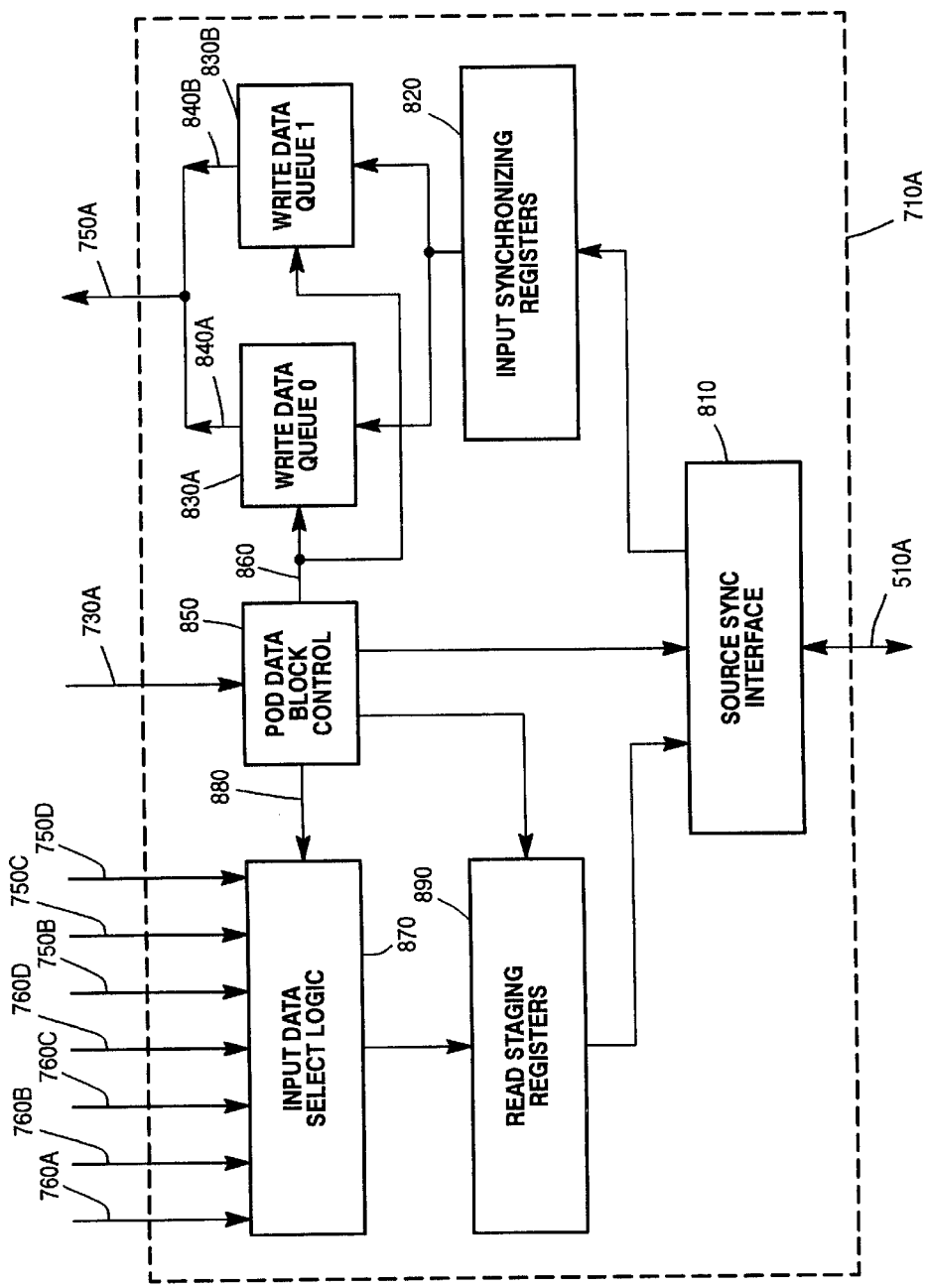
FIG. 8 is a block diagram of the POD Data Block.

FIG. 8 is a block diagram of POD Data Block 710A. Although POD Data Block 710A is shown and described, the discussion applies to any of the POD Data Blocks 710. As discussed above, the POD Data Blocks buffer and route data between the PODs 120 and the MSU Data Blocks 720. The data may include cache lines from either one of the PODs 120 or one of the MCLs 535, or may comprise message data from one of the PODs.

When data is received from one of the PODs during a Return, Flush, I/O Overwrite, or a Message Operation, the Source Sync Interface 810 receives data on 64-bit Data Lines 510A using strobe lines which are provided by POD 120A along with the data. The Source Sync Interface provides the data to the Input Synchronizing Registers 820, where the data is captured by latches on the active edge of the MSU clock without adding any metastability wait periods. This provides maximum throughput.

After the data is synchronized within the MSU 110A, the data is routed to either Write Data Queue 0 830A or Write Data Queue 1 830B depending on which one is least full. If both of the Write Data Queues contain an equal number of write requests, the data is routed to Write Data Queue 0 830A. Each of the Write Data Queues can store up to eight cache lines of data.

As mentioned above, Line 750A includes two independent 128-bit sets of Data Signals labelled 840A and 840B.

Write Data Queue 0 830A drives Data Signals 840A, and Write Data Queue 1 830B drives Data Signals 840B. Both of these sets of Data Signals 840A and 840B are provided to all of the MSU Data Blocks 720, and to all other POD Data Blocks 710, and both may be driven simultaneously.

During transfer operations, MCA 550 provides control signals on one(s) of the POD Data Block Control Lines 730 and one(s) of the MSU Data Block Control Lines 740 to enable the requested transfer of data as determined by the addresses on Address/command Lines 520. If a POD Data Block 710 is sending the data, control information is received on Control Line 730 (shown as Control Line 730A) by POD Data Block Control 850. In turn, POD Data Block Control 850 generates control signals on Line 860 which enables one of the Write Data Queues 830. The selected one of the Write Data Queues 830 drives the respective one of the Data Signals 840, .thereby providing data to either an MSU Data Block 720, or to another POD Data Block 710.

If the POD Data Block 710 is receiving data, the data may be received either from another POD 710 (for example, during a Return or a Message Operation), or the data may be received from an MSU Data Block 720 (during a Fetch operation.) When data is received from another POD Data Block 710, the data is received on the respective one of Lines 750 (shown as 750B, 750C, and 750D) by Input Data Select Logic 870. POD Data Block Control 850 provides control signals on Line 880 to enable Input Data Select Logic 870 to select the data and route it to the Read Staging Registers 890 where it is temporarily stored. Since the Source Sync Interface 810 is bi-directional, and since POD 120A may be sending data on Data Lines 510A at any instant in time, the data stored in the Read Staging Registers 890 may be held for a short period of time before the interface becomes available. Read Staging Registers 890 eventually provides the data to the Source Sync Interface 810, which in turn forwards it to POD 120A via Data Lines 510A. If the data was instead received from one of the MSU Data Blocks 720, the transfer operation would be similar to that discussed above except the data would be received by Input Data Select Logic 870 on the respective one of Lines 760A, 760B, 760C, or 760D.

The POD Data Block is capable of staging data into the Read Staging Registers 890 at the same time the Source Sync Interface is receiving data from, or transferring unrelated data to, POD 120A. Meanwhile, both Write Data Queues 840A and 840B may each be providing data to a respective one of the MSU Data Blocks 720. Therefore, four transfer operations involving POD 120A can be occurring simultaneously.

MSU Data Block

Figure 9:
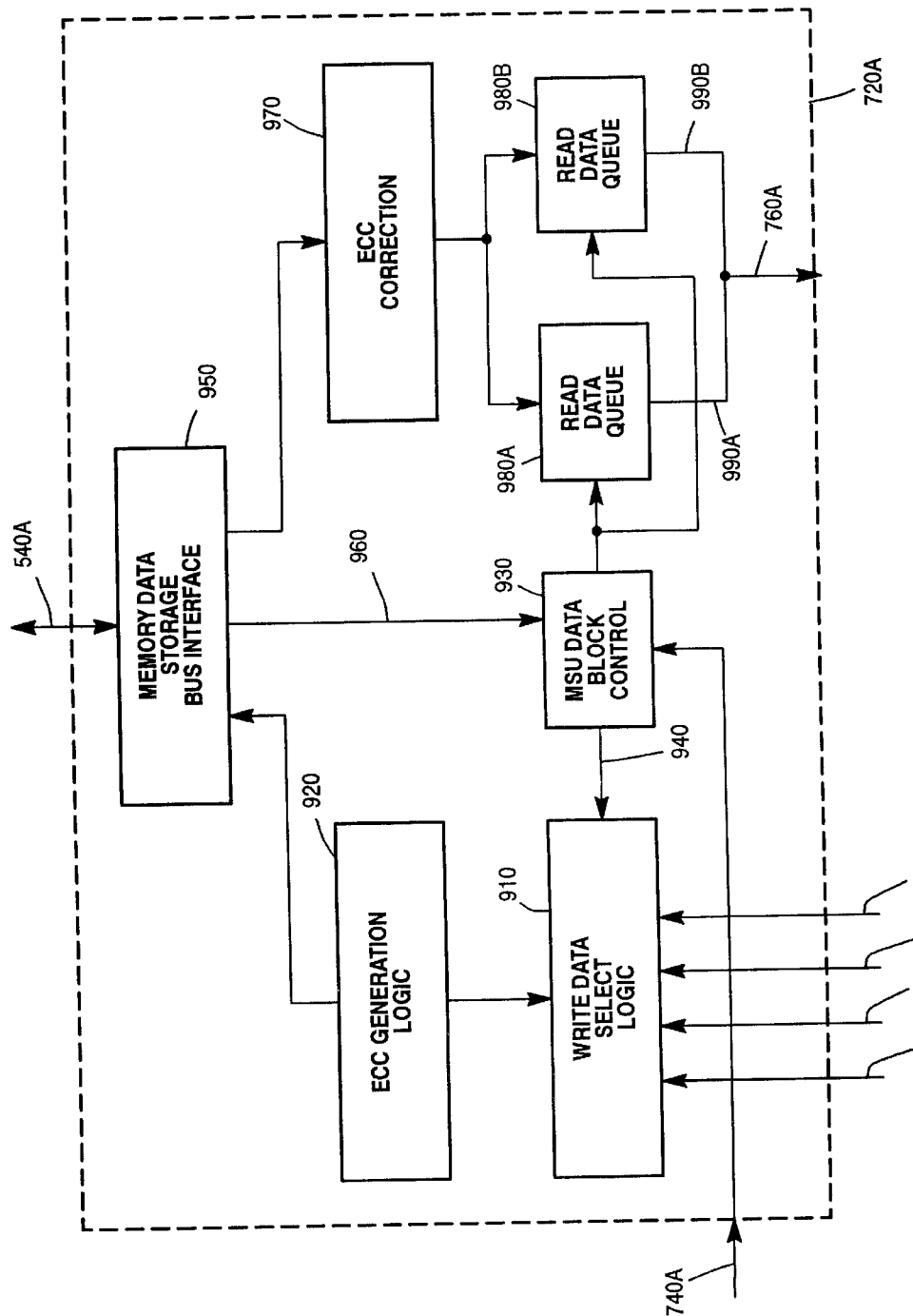
FIG. 9 is a block diagram of the MSU Data Block.

FIG. 9 is a block diagram of the MSU Data Block. Although MSU Data Block 720A is shown and described, it is understood that this discussion applies equally to all MSU Data Blocks 720. The MSU Data Blocks buffer and route data between POD Data Blocks 710 and the MCLs 535. During a POD-to-MCL write operation, data is received from one(s) of the POD Data Blocks 710A, 710B, 710C, and 710D on Lines: 750A, 750B, 750C, 750D, respectively. As discussed above, each of Lines 750 includes two independent 128-bit sets of data signals that can each be transferring data simultaneously during two different data transfer operations. The Write Data Select Logic 910 selects the appropriate set of data signals to be routed to ECC Generation Logic 920. The data selection is controlled by MSU Data Block Control 930, which receives MSU Data Block Control Line 740A from the MCA 550 and in turn generates Control Line 940 to the Write Data Select Logic.

After the 128 bits of data is routed to the ECC Generation Logic 920, the ECC Generation Logic strips the parity and generates the appropriate check bits required for the Single-Bit Error Correction/Double-Bit Error Detection (SBEC/DED) scheme employed to protect the data integrity. The ECC Generation Logic 920 transfers the data to the Memory Data Storage Bus Interface 950, which is capable of storing two cache lines of data. A cache line is stored within Memory Data Storage Bus Interface prior to being transferred to an MCL so that once the actual memory operation to the MCL is initiated, the time required to transfer the data from a POD Data Block 710 to an MSU Data Block 720 is not imposed as overhead in the ensuing memory operation. The MSU Data Block Control 930 provides control information to the Memory Data Storage Bus Interface 950 on Line 960, thereby enabling the Memory Data Storage Bus Interface so that data is provided on Data Bus 540A to MCL 535A according to the timing sequence required by the SDRAMs within the MSU Expansions 610.

During a read operation, the MCA 550 provides control information to the MSU Data Block Control 930 on Line 740A prior to data being received from MCL 535A on Data Bus 540A. In response, MSU Data Block Control 930 generates control signals which are provided on Line 960 to the Memory Data Storage Bus Interface 950 to allow the Memory Data Storage Bus Interface to receive the data from the addressed one of the MSU Expansions 610 within MCL 535A. As this data is being read, it is passed to the ECC Correction Logic 970 which corrects any single bit errors and detects multiple bit errors (MUE)s. If a MUE is detected, an error indicator is returned with the data to the requesting POD 120 so the error can be handled.

After being processed by the ECC Correction Logic 970, the data is provided to one of two Read Data Queues 980A and 980B. The data is stored in the Read Data Queue which is least full. Each Read Data Queue 980 can store up to four cache lines of data. When the stored data reaches the front of the Read Data Queue 980A or 980B, it is provided on the associated one of the Data Lines 990A or 990B, respectively, to the selected one of the POD Data Blocks 710 as controlled by MCA 550. Each of the Data Lines 990 includes 128 bits, and each of the Data Lines is capable of performing transfers simultaneously. Data Lines 990A and 990B are shown collectively as Lines 760A. MSU Data Block 720A is therefore capable of performing three transfer operations in parallel, data may be routed from one of Lines 750 to Data Bus 540A at the same time a data transfer is being performed on each of Lines 990A and 990B to a respective POD Data Block 710.

Memory Controller

Figure 10:
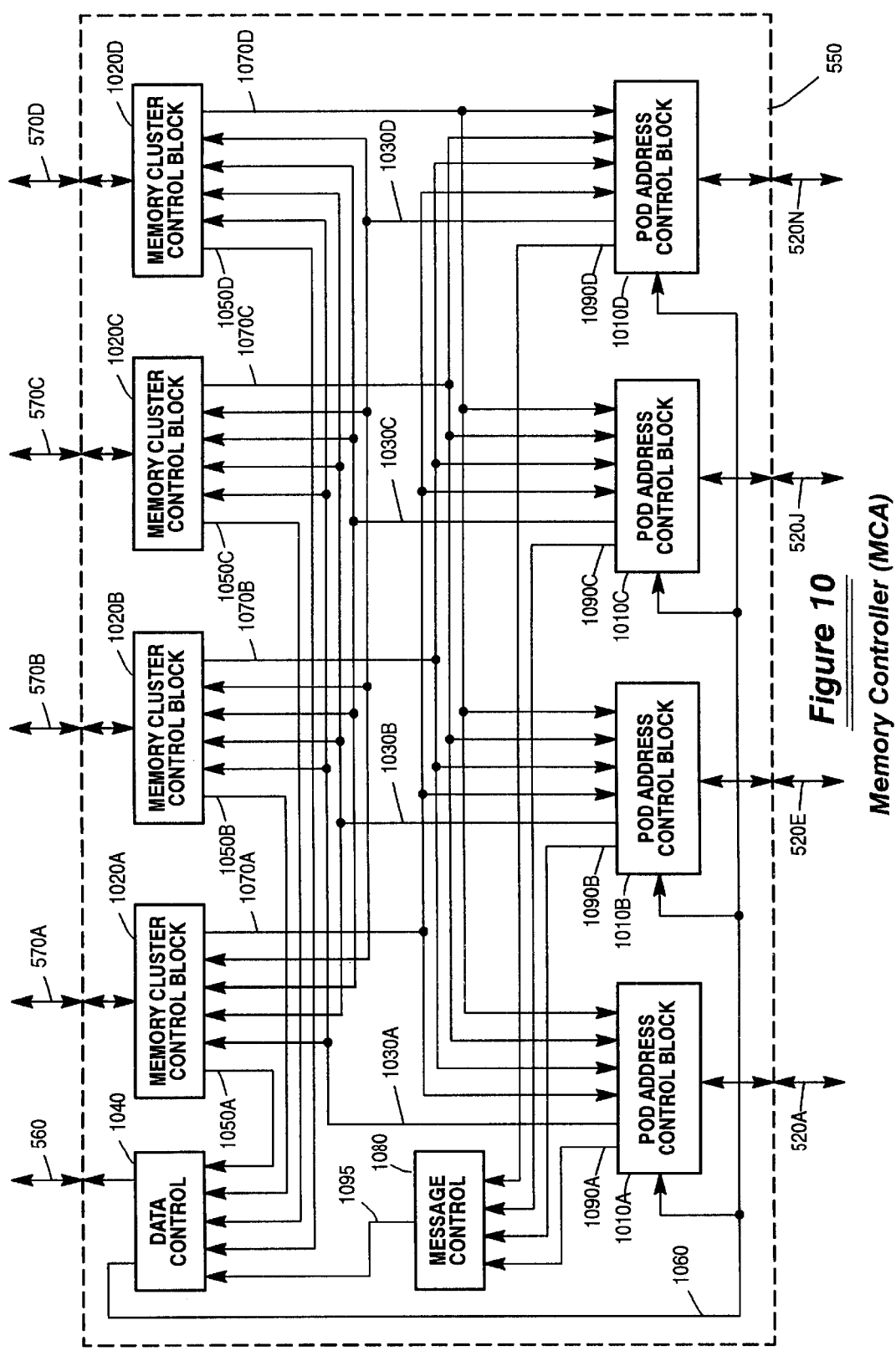
FIG. 10 is a block diagram of the Memory Controller (MCA)

FIG. 10 is a block diagram of the Memory Controller (MCA) 550. Although the following discussion specifically describes logic within MSU 110A, it is understood that this discussion applies equally to all MCAs included within all MSUs within Platform 100. The MCA 550 provides the control for data transfers occurring within the MDA 530. As discussed above, these transfers basically involve three types of operations: writing a cache line from a POD 120 to an MCL 535, reading a cache line from an MCL 535 to a POD 120, and transferring data (either message or Return data) from one POD 120 to another POD 120. MCA 550 controls each of these operations which are described in turn below.

A POD 120 writes a cache line to an MCL in three situations: during Flush, I/O Overwrite, and Return Operations. The MCA operation during a Return Operation is discussed below in association with the execution of Fetch operations, and the MCA operation during Flush and Overwrite operations is discussed as follows.

Flush operations occur when modified data is aged out of a POD's Second Level Cache 460 or Third Level Cache 410 and is written back to one of the MSUs 110. I/O Overwrite operations occur when the I/O is providing new data that is to replace whatever data currently is stored within a specified address within a MSU. In either instance, logic within the Crossbar Module 220 of the requesting one of the PODs 120A, 120B, 120C, and 120D determines which MSU 110 is mapped to a particular request. address. As discussed above, each MSU is mapped to a predetermined range or range(s) of addresses within the entire range of the main memory address space.

The POD provides the address and associated command to the appropriate MSU 110 via respective ones of the Address/command Lines 520. For example, POD 120A provides an address and command over Address/command Lines 520A to POD Address Control Block 101A, and so on. Address/command Lines 520 include bi-directional address signals, an output response signal, and various request, arbitrate and hold lines to control the flow of information to and from the respective one of the PODs 120. The address, command, and associated control information is stored within a respective one of the POD Address Control Blocks 1010A, 1010B, 1010C, and 1010D until it is selected as being associated with the next request to process.

When an address is selected as the next request address to process, :it is provided to a selected one of the Memory Cluster Control Blocks 1020A, 1020B, 1020C, and 1020D via unidirectional address/control signals shown as Lines 1030A, 1030B, 1030C, and 1030D, respectively, based on the address. In a fully populated MSU, each of the Memory Cluster Control Blocks 1020 handles one-fourth of the address range of the MSU. The selected Memory Cluster Control Blocks 1020A, 1020B, 1020C, and 1020D stores an address until it is selected for presentation to the associated MCL 535A, 535B, 535C, and 535D, respectively, across Address Lines 570A, 570B, 570C, and 570D, respectively. For example, addresses from Memory Cluster Control Block 1020A are presented to MCL 535A across Address Lines 570A, and so on. Memory Cluster Control 1020 selects an address for transfer to an MCL 535 based on which MSU Expansion 610 within the MCL 535 becomes available first to accept another request as will be discussed further below.

When a Memory Cluster Control Block 1020 selects an address for transfer to one of the MCLs 535, the Memory Cluster Control Block makes a request to Data Control 1040 on an associated Request Line 1050 (shown as Request Lines 1050A, 1050B, 1050C, and 1050D). For example, prior to a transfer of an address from Memory Cluster Control Block 1020A to MCL 535A, Memory Cluster Control Block makes a request on Line 1050A to Data Control 1040. In response, Data Control 1040 provides the necessary control information on Line 560 to the POD Data Block 710 arid MSU Data Block 720 participating in the transfer. During a Flush or I/O Overwrite operation, the appropriate one of the POD Data Blocks 710 is enabled to provide data to one of the MSU Data Blocks 720, which in turn is enabled to provide data to the associated one of the MCLs 535. This occurs as the address is provided by the associated one of the Memory Cluster Control Blocks 1020 to the MCL.

Turning now to the operation of the MCA 550 during Fetch operations, Fetch operations are initiated in the same manner as described above. One of the PODs 120 provides the request address to the respective one of the POD Address Control Blocks 1010, where the address is queued, and eventually transferred to the addressed Memory Cluster Control Block 1020. When the address is selected as the next address to be presented to the associated MCL 535, the Memory Cluster Control Block 1020 issues a request to the Data Control 1040. Sometime after the request is made, the Data Control 1040 provides the associated control to the MDA 530 on Line 560 to enable the appropriate MSU Data Block 720 to receive the cache line from the addressed MCL 535. The cache line is stored in one of the Read Data Queues 980 as discussed above.

In addition to the cache line, the MCL also provides nine bits of directory state information from the addressed Directory Storage Arrays 630 to the MCA, 550 over the respective one of Lines 570. Logic in the associated Memory Cluster Control Block uses the directory state information to determine if the cache line is Present in the MSU 110, meaning that the MSU "owns" the latest copy of the cache line data. If the MSU does own the requested cache line, the MCA controls the transfer of the cache line from the MSU Data Block 720 to the POD Data Block 710 associated with the requesting POD, and further controls the subsequent transfer of the cache line to the requesting POD. As the data is being provided to the POD Data Block 710, Data Control 1040 also provides control information on Line 1060 which causes the appropriate POD Address Control Block 1010 to issue the required response for the transfer. During a Fetch operation, the response is generated to the requesting POD when the first data transfer for a cache line is provided on lines 510. Part of the information in the response includes a "job number" used to associate the data with a particular request. The job number is necessary because a POD may have up to sixteen requests pending to main memory at any given time, and these requests may not necessarily be serviced in order. Therefore, the POD must be informed as to which outstanding request is associated with the returned data.

As discussed above, a POD may also initiate a Fetch operation for a cache line that the MSU does not own. If the directory state information retrieved from the Directory Storage Array 630 indicates another POD has exclusive ownership of that data, the MCA controls initiation of a Return Operation. This results in the retrieval of the latest copy of the cache line from the POD 120 that owns the data. In these cases, the MCA transfers the address associated with the requested cache line from the Memory Cluster Control Block 1020 to the appropriate one of the POD Address Control Blocks 1010A, 1010B, 1010C or 1010D over the associated interface shown as Line 1070A, 1070B, 1070C, or 1070D, respectively. Since each Memory Cluster Control 1020 operates independently, there is a separate address bus from each Memory Cluster Control Block to each POD Address Control Block 1010 such that each POD Address Control Block can receive up to four address requests simultaneously. The POD Address Control Block stores the pending request addresses until they can be presented in a serial manner to the associated POD over bi-directional Address/command Lines 520 along with a Return function.

When an address and an associated Return function are presented to a POD 120 over the associated Address/command Lines 520, the address is forwarded to the cache (either the Third Level Cache 410 or a Second Level Cache 460) that stores the current copy of the data in a manner which is beyond the scope of this invention. For more information on cache coherency in the Platform of the present invention, see the co-pending Application entitled "A Directory-Based Cache Coherency System". After any in-progress operations are completed on the requested cache line, it is returned to the MSU 1110 on the associated one of Data Lines 510. Up to four return functions may be initiated from an MSU simultaneously. Furthermore, up to 32 return functions may be outstanding to the PODs at any given instant in time. The PODs need not respond to these return functions in the order in which the functions were issued.

When a POD 120 returns a cache line in response to a return function, it is stored within one of the Write Data Queues 830 within the POD Data Block 710 for that POD. Data Control 1040 generates control signals on. Line 560 to cause the cache line to be transferred via the respective one of Lines 750 to the POD Data Block 710 associated with the requesting POD 120. In addition, the MCA 550 controls the transfer of the cache line from the POD Data Block 710 which is associated with the previous owner to the appropriate MSU Data Block 720 associated with the cache line address, and finally to the addressed MCL 535 so that the MSU has the latest copy of the data. The Memory Cluster Control Block 1020 associated with the addressed MCL 535 generates updated directory state information which reflects the new access status of the data. This updated directory state information is written back to the Directory Storage Array 630 in the addressed MCL over Lines 570 as controlled by signals on Control Line 560.

In another instance, a POD may initiate a Fetch operation for a cache line that the MSU does not own, but that is resident in a shared access state in one or more other caches. In this case, the MSU has the most recent copy of the data since data held under shared access may not be modified. The MSU may therefore provide the data to the requesting POD in the manner discussed above. In addition, if the Fetch operation requested exclusive access status, a Purge function must be issued to the POD(s) having the shared local copies, thereby causing these POD(s) to invalidate their local copy.

In addition to controlling transfers of cache line data, the MCA 550 also controls the POD-to-POD transfers of message data. Within the MCA, message routing information is passed from the POD Address Control Block 1010 to the Message Control 1080 on the respective one of Lines 1090 (shown as Lines 1090A, 1090B, 1090C, and 1090D) where this routing information is stored in a FIFO queue structure (not shown). The routing information for the message at the front of the FIFO is made available to the Data Control 1040 on control lines shown collectively as Line 1095. Since data transfers between a POD and memory, or between one POD and another POD take priority over message transfers, the Data Control 1040 will not generate the control signals necessary to perform the message transfer until any pending data transfers that compete for use of the same interface on Line 750 are completed. When Data Control 1040 does select the message for transfer, Data Control generates control signals on Line 560 which are driven to the MDA 530. The control signals enable the transfer of message data from one of the Write Data Queues 830 of a first (sending) POD Data Block 710 to the input Data Select Logic 870 of another (receiving) POD Data Block on the appropriate interface represented by one of Lines 750. This message data is then routed to the associated POD 120 on Data Lines 510. The Data Control 1040 also generates control signals on Line 1060 to the POD Address Control Blocks 1010 associated with both the POD sending, and the POD receiving, the message data. This causes a respective one of the POD Address Control Blocks to send a response to the sending POD indicating that the message data has been transferred, and further causes a different respective one of the POD Address Control Blocks to send a response to the receiving POD indicating that message data is available. The message passing facility of Platform 100 is discussed in detail in the Co-Pending application Ser. No. 08/964,606 now U.S. Pat. No. 6,014, 709 entitled "Message Flow Protocol for Avoiding Deadlocks," incorporated herein by reference in its entirety. Up to two messages may be routed simultaneously within the MDA 530, and message routing may occur in parallel with receiving data from, and/or transferring data to, ones of the PODs, and receiving data from, and/or transferring data to, ones of the MCLs 535.

POD Address Control

Figure 11:
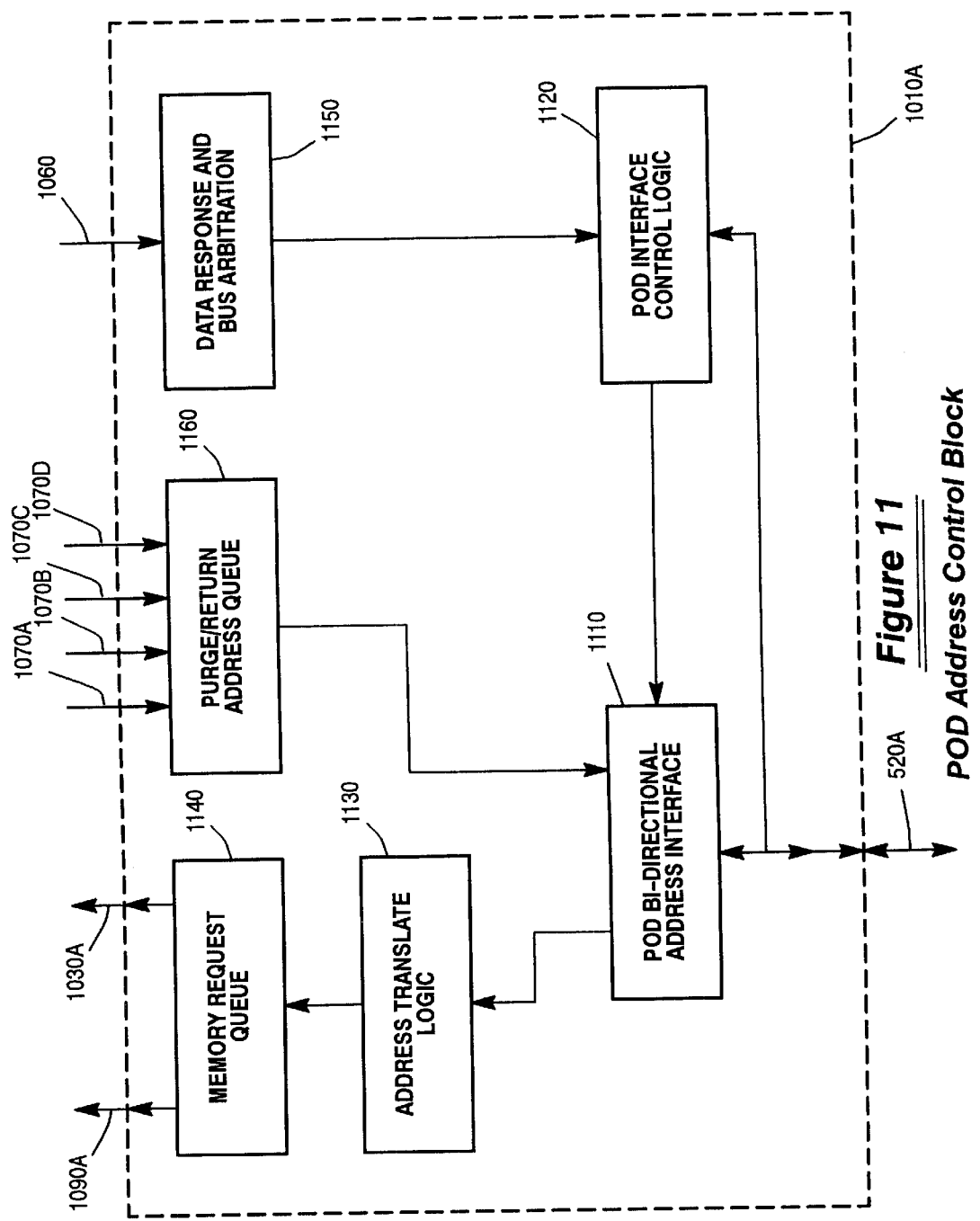
FIG. 11 is a block diagram of the POD Address Control Block.

FIG. 11 is a block diagram of the POD Address Control Block. Address Control Block 1010A is shown and described, but it is understood that this discussion applies equally to all POD Address Control Blocks 1010. The POD Bi-directional Address Interface 1110 interfaces with the POD 120A over bi-directional interface shown as Address/command Line 520A. This bi-directional interface is used to send and receive addresses and related control information to/from POD 120A as described above.

POD Bi-directional Address Interface 1110 is controlled by a distributed state machine that is located in both the POD Interface Control Logic 1120 and in POD 120A. This distributed state machine determines the direction of the bi-directional interface shown on Address/command Line 520A. To obtain optimal system performance, the bi-directional interface on Address/command Line 520A is normally driven by POD 120A even when the interface is idle. As a result, no time is wasted when the POD initiates an address transfer from the POD to the MSU 110 during a Fetch, Flush, I/O Overwrite or Message Operation.

When an address is received from POD 120A on Address/command Line 520A during one of these operations, the address is stored in staging registers in POD Bi-directional Address Interface 1110. The address is then provided to the Address Translate Logic 1130, which performs a translation function on the address based on a address translation pattern stored in a general register array. This translation function re-maps certain addresses provided by the POD 120A to different areas of real memory to allow for memory bank interleaving, expanded memory capacity, and memory sharing capabilities.

After translation, the address is stored in Memory Request Queue 1140 prior to being transferred to a selected one of the Memory Cluster Control Blocks 1020 on Line 1030A. Memory Request Queue 1140 can store up to 16 addresses. The Memory Request Queue 1140 selects the next address for transfer to a Memory Cluster Control Block 1020 based on the type of operation being performed, the order in which the address was placed in the queue, and on whether or not the Memory Cluster Control Block 1020 associated with the addressed one of the Memory Clusters 535 is available to receive another request address. For Fetch or Flush operations, the selected address is removed from the Memory Request Queue and routed to one of the Memory Cluster Control Blocks 1020 as determined by the address. For Message operations, the current request address is routed via Line 1090A to the Message Control 1080 to be queued as discussed above. An address can be delivered to a Memory Cluster Control Block 1020 every two clock cycles, or every 20 nanoseconds.

As discussed above, an address can also be provided to the POD Address Control Block 110A from each of the Memory Cluster Control Blocks 1020A, 1020B, 1020C, and 1020D on Lines 1070A, 1070B, 1070C, and 1070D, respectively, during Return or Purge Operations. Return Operations are initiated when a POD requests access to a cache line that is indicated by the associated directory state information as already being exclusively owned by a cache entity within another POD. The address of the cache line is therefore provided to the POD currently owning the data so that the data can be returned to the MSU 110.

For example, assume one of PODs 120B, 120C, or 120D provides a Fetch address to the MCA which is ultimately transferred to the Memory Cluster Control Block 1020 associated with the addressed cache line. After the cache line is read from the addressed MCL 535, it is determined that POD 120A has exclusive ownership of the requested cache line. In response, one of the Memory Cluster Control Blocks 1020 provides the address over the associated one of Lines 1070 to Purge/Return Address Queue 1160. Purge/Return Address Queue selects one of queued addresses using a rotational priority selection scheme for presentation to the POD Bi-directional Address Interface 1110. In addition, Data Control 1040 provides control information via Line 1060 to Data Response and Bus Arbitration Logic 1150 within the POD Address Control Block 1010 associated with the POD currently owning the data. Data Response and Bus Arbitration Logic 1150 interfaces with, and provides control information to, POD Interface Control Logic 1120. POD Interface Control Logic determines, according to a predetermined priority scheme, when the MSU may drive Address/command Line 520 with the cache line address and the Return function. Once the bi-directional Address/command Line 520A may be driven by POD Bi-directional Address Interface 1110, the distributed state machine within the POD Interface Control Logic 1120 and POD 120A controls the presentation of the Return address from POD Bi-directional Address Interface 1110 to POD 120A. The POD 120A then returns data in the manner discussed above.

The same mechanism discussed above is used in association with a Purge function. As discussed above, a Purge function is initiated when a POD requests exclusive ownership of a cache line that is held by one or more PODs as shared owners. In this situation, the most recent copy of the data is held by the MSU 110 because PODs having shared ownership rights are not allowed to. modify the data. Therefore, the requesting POD can obtain the cache line(s) from the MSU. However, the shared owners must be notified to invalidate their local copied. One of the Memory Cluster Control Blocks 1020 provides the cache line address and an associated Purge function to one or more of the POD Address Control blocks 1010 associated with the current shared owner(s). The POD Address Control Block(s) presents the addresses to the POD(s) in the manner described above with respect to Return functions, except that the POD(s) do not return data, but instead designate the local copies of the cache line as invalid.

Figure 12:
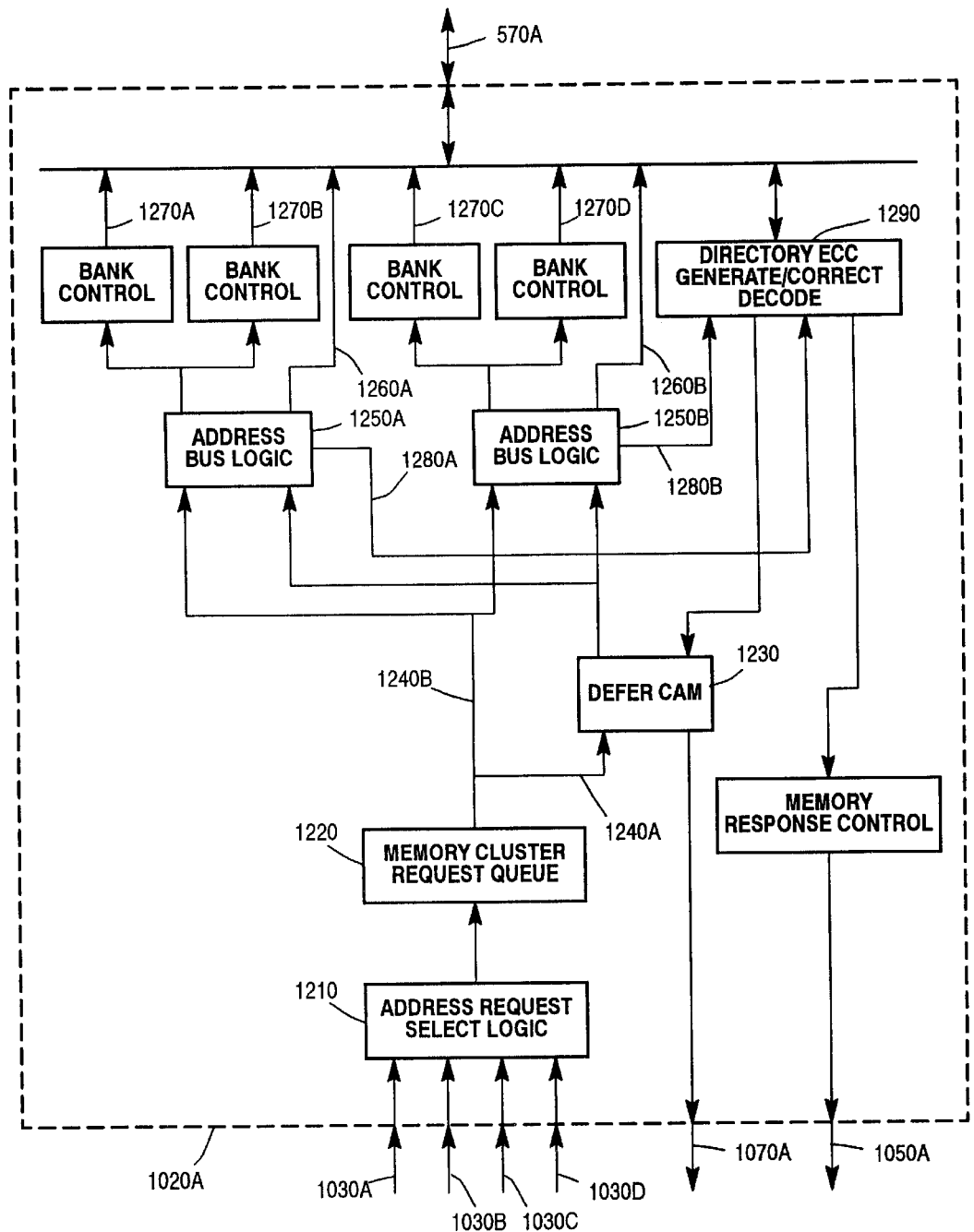
FIG. 12 is a block diagram of the Memory Cluster Control Block.

FIG. 12 is a block diagram of Memory Cluster Control Block 1020A. Although Memory Cluster Control Block 1020A is shown and described, the discussion applies equally to all Memory Cluster Control Blocks. Memory Cluster Control Block 1020A receives addresses from each of POD Address Control Blocks 1010A, 1010B, 1010C, and 1010D on 128-bit interfaces represented as Lines 1030A, 1030B, 1030C, and 1030D, respectively. These addresses are provided to Address Request Select Logic 1210. Since each of these interfaces operates independently, four addresses may be pending at the Address Request Select Logic 1210 at once.

As discussed above, when a POD Address Control Block 1010 provides an address on a respective one of Lines 1030, the address is driven to all Memory Cluster Control Blocks 1020 within the MCA 550. However, in a fully populated MSU 110, each of the Memory Cluster Control Blocks 1020 handles only one-fourth of the address range of the MSU. The Address Request Select Logic 1210 provides the filtering function which selects addresses from the appropriate one-fourth of the address range for presentation to the Memory Cluster Request Queue 1220, where the address is stored.

Logic within the Memory Cluster Request Queue 1220 selects an address for presentation to the MCL 535. The selection is not made based on a purely first-in, first-out basis, but is made to maximize the number of requests being processed simultaneously within an MCL. As discussed above, the MCL allows up to four requests to be in process simultaneously, one to each of the available MSU Expansions 610. Therefore, when one of the MSU Expansions completes an operation, the next request presented to the MCL is the oldest pending request within the Memory Cluster Request Queue 1220 which maps to the available MSU Expansion. The simultaneous processing of requests is discussed in more detail below.

After the Memory Cluster Request Queue 1220 selects an address as the next request address to be presented to the MCL 535, the address is passed to Defer Cam 1230 on Line 1240A. Defer Cam 1230 stores every address within the respective one of the MCLs 535 that is associated with an in-progress MSU operation including a Fetch, Flush, Return, or I/O Overwrite. If the current address presented on Line 1240A addresses the same cache line as one of the addresses already stored within the Defer Cam 1230, a new entry is made in the Defer Cam, but the current address is not presented to an MCL immediately. The current address will not be handled, that is, the request will be deferred, until the in-progress operation associated with that address has been completed and the older conflicting address is removed from the Defer Cam. If this restriction were not imposed, data inconsistency could result, that is, a POD could access a cache line of data that was in the process of being modified so that it included some new data and some old (not yet modified) data. This is an unacceptable condition, and will result in processing errors.

Before continuing with the current example, a review of the logic of the MCL is provided for discussion purposes. As shown in FIG. 6 and discussed above, an MCL 535 may contain up to four MSU Expansions 610. If the MCL is fully populated, each of the MSU Expansions maps to one-fourth of the address range of the MCL. Within the MCL, two MSU Expansions share one of the Address Buses 640. MSU Expansions 610A and 610C share Address Bus 640A, and MSU Expansions 610B and 610D share Address Bus 640B. Each of these Address Buses 640 are driven by a respective one of the Address Bus Logic 1250A and 1250B of the Memory Cluster Control Block 1020A. For example, Address Bus Logic 1250A drives Address Bus 640A via Line 1260A. Similarly, Address Bus Logic 1250B drives Address Bus 640B via Line 1260B. Each of the Bank Control 1270A, 1270B, 1270C, and 1270D provide the control signals that enable one of MSU Expansions 610A, 610B, 610C, and 610D, respectively. The MSU Expansion that is enable depends on the request address. The control signals provided by Bank Control 1270, and the address signals on Lines 1260A and 1260B are shown collectively as Address Lines 570A.

Returning now to the current example, if the current address does not conflict with an address stored within the Defer Cam 1230, it is provided on Line 1240B to one of the Address Bus Logic 1250A and 1250B. Only one of Address Bus Logic 1250A and 1250B is enabled to receive the address based on which one of the MSU Expansions 610 is mapped to the address within the MCL 535. The request address is driven onto Lines 1260 for presentation to the appropriate one of the MSU Expansions 610 via the associated one of the Address Buses 640. The Bank Control associated with the MSU Expansion 610 provides the control signals that enable the selected MSU Expansion to receive the address.

In addition, the Address Bus Logic 1250 provides control signals on the respective one of Lines 1280A or 1280B to Directory ECC Generate/Correct Decode 1290. These control signals enable Directory ECC Generate/Correct Decode 1290 to receive the nine bits of directory state information from the Directory Storage Array 630 stored within the addressed MSU Expansion 610 via the Directory Data Bus 650. The Directory ECC Generate/Correct Decode 1290 further receives ECC bits which provides single-bit error correction and double-bit error detection on the directory state information. The Directory ECC Generate/Correct Decode 1290 corrects and/or detects errors associated with the directory state information, then modifies the information to reflect new access status, and finally re-writes the information back to the addressed Directory Storage Array 630. Directory ECC Generate/Correct Decode also provides control signals to Memory Response Control 1295 via Line 1296. In turn, Memory Response Control 1295 may generate signals on Line 1050A to Data Control 1040 of the MCA which will result in a Response being issued to the requesting POD 120. For example, if a Fetch is occurring and the directory state. information indicates the MSU owns the data, Memory Response Control 1295 generate signals on Line 1050A to ultimately cause a Response to be provided with the data to the POD. However, if the directory state information indicates another POD exclusively owns the data, Memory Response Control 1295 does not generate signals on Line 1050A until the previous owner returns the data, which may then be provided. to the requesting POD.

In addition to providing control signals to Memory Response Control 1295, Directory ECC Generate/Correct Decode also provides control signals to the Defer Cam 1230 to signal when an address should be removed from the Defer Cam. For example, during a Fetch Operation in which the directory state information indicates the MSU owns the data, or wherein one or more PODs have shared access to the data, the Directory ECC Generate/Correct Decode generates control signals to the Defer Cam via Line 1297 shortly after the MSU Expansion provides the requested data. This is because the operation is considered completed, and the associated address is therefore removed from the Defer Cam, and the data is returned to the requesting POD. However, following a Fetch Operation involving data exclusively owned by another POD, the Directory ECC Generate/Correct Decode does not generate the control signals to the Defer Cam until the Return Operation is completed, since until this time, the operation is still considered to be in-progress, and no further operations may be initiated to the same cache line.

Figure 13A:
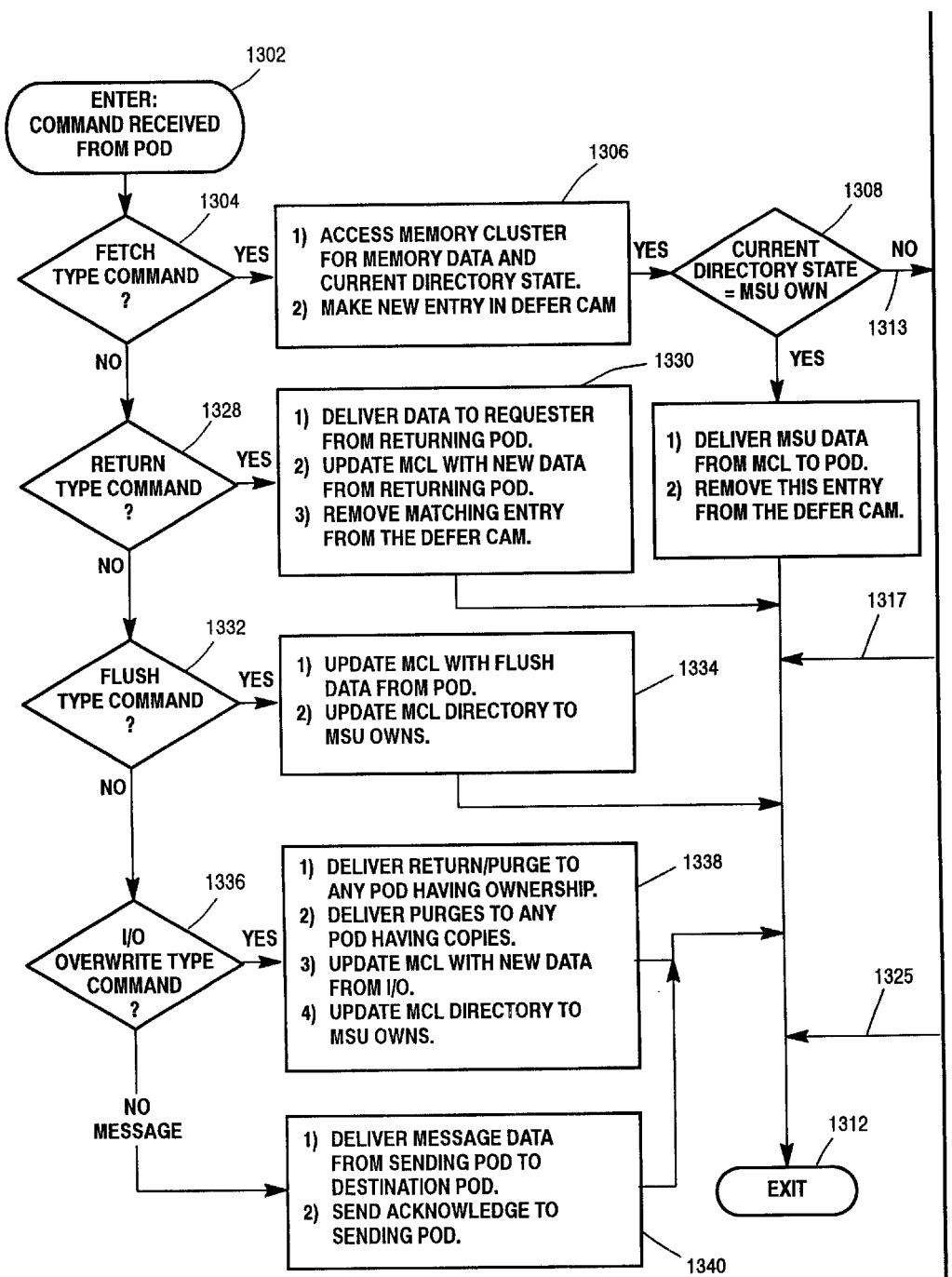
FIGS. 13A and 13B, when arranged as shown in FIG. 13, is a flowchart of MSU operations.
Figure 13B:
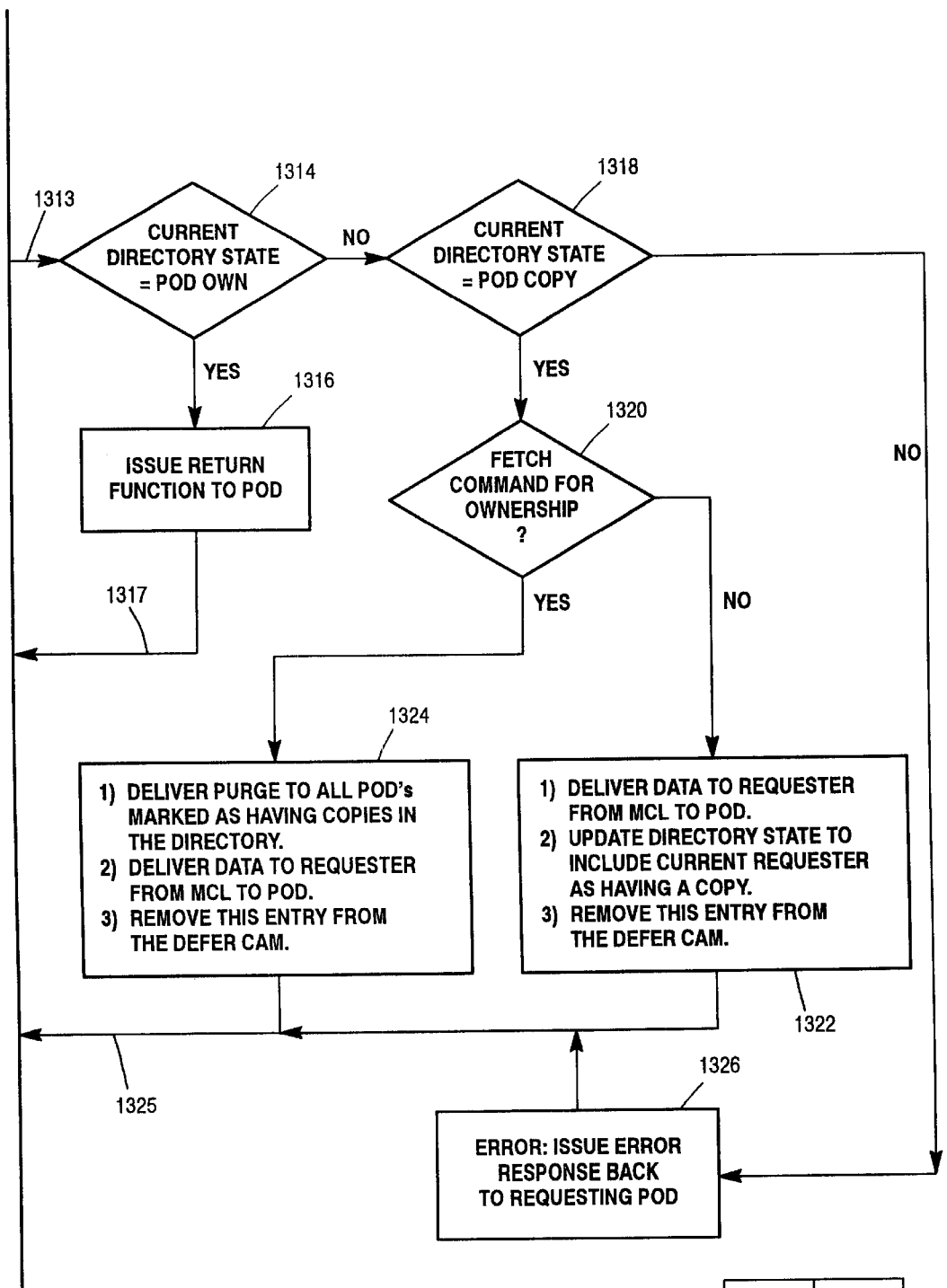

FIGS. 13A and 13B, when arranged as shown in FIG. 13, is a, flowchart of MSU operations. As discussed above, each of the PODs 120 provides address and command information on Address/command Lines 520 to the MCA 550. The address and command information is used by state machines within the MCA 550 to control the flow of data between ones of the PODs and between the PODs and the MCLs 535.

The commands provided by the PODs on Address/command Lines 520 includes Fetch, Return, Flush, I/O Overwrite, and Message commands. If a Fetch command is presented by the POD as shown in Block 1304, the memory address provided by the POD is latched within the MCA and eventually provided to the addressed MCL 535 as shown in Block 1306. In response, the appropriate MSU Expansion 610 returns the addressed 64 bytes of cache line data to the MDA 530 and further returns the addressed directory state information to the Address Bus Logic 1250 of the MCA. In addition, the Fetch address is stored in the Defer Cam 1230 so that any subsequent operations to the same address will be deferred until the current operation is completed.

After the directory state information is returned to the MCA, the ownership of the cache line is determined as indicated by Block 1308. If the cache line is owned by the MSU, no other POD has a valid copy of the data, and the cache line may therefore be delivered to the requesting POD as indicated in Block 1310. The cache line address is removed from Defer Cam 1230 so that another operation may be, performed to this cache line, and the operation is considered complete, as indicated in Block 1312.

If the cache line was not owned by the MSU in Block 1308 as indicated by path 1313, another POD has a copy of the requested cache line. In Block 1314, it is determined whether the directory state information indicates that this copy is held by another POD under exclusive ownership. If it is, the MCA 550 issues a Return function over Address/command Line 520 to the POD having exclusive ownership, as shown in Block 1316. After the Return function has been. sent along with the requested cache line address, path 1317 is traversed and the operation is suspended as shown in Block 1312. The operation is resumed when the POD having ownership of the data returns the requested cache line to the MSU 110. It should be noted that the request address is not removed from the Defer Cam, and no subsequent operation may be performed to this address until the Return Operation is completed.

If in Block 1314, the cache line was not held under exclusive ownership by another POD, one or more other PODs 120 may have shared local copies of the data for read-only purposes, as determined in Block 1318. If the current POD is only requesting shared ownership of the data for read-only purposes, as determined by Block 1320, a copy of the data may be delivered to the requesting POD, and the directory state information may be updated to reflect the existence of the new shared owner as shown in Block 1322. In addition, the request address is removed from the Defer Cam so that future requests may be made to the cache line address. This completes the operation as shown in Block 1312.

If in Block 1320, the requesting POD is determined to be requesting exclusive ownership of a cache line which is owned on a read-only basis by one or more other PODs, the MCA issues a Purge function to the other POD(s) as indicated by Block 1324. The data is provided to the requesting POD, the directory state information is updated to reflect the new exclusive owner of the cache line, and the cache line address is removed from the Defer CAM. Path 1325 is traversed, and the operation is considered completed as shown in Block 1312.

If in Block 1318, it is determined that neither the MSU, nor any other POD has ownership of the cache line, an error has occurred in the directory state information. An error response is issued to the requesting POD, and error recovery processing is initiated as indicated by Block 1326.

Continuing now with an explanation of the Return function, after a Return function has been issued by. the MSU to one of the PODs as discussed above, the POD will eventually respond by returning the requested cache line to the MSU during a Return Operation. This is determined in Block 1328. During the Return Operation, the cache line is delivered to the POD which originally requested the data and the directory state information is updated to reflect the new owner as shown in Block 1330. the cache line address is removed from the Defer Cam, and the operation is completed, as indicated by Block 1312.

A POD may also issue a Flush command to the MSU 110 as determined in Block 1332. A Flush command is issued when data that has been modified is aged from one of the POD caches. The updated data is written back to the addressed MCL, the directory state information is updated to indicate that the MSU now owns the data.

A POD 120 may present an I/O Overwrite command to the. MSU as determined in Block 1336. As discussed above, an I/O Overwrite command is a command received from one of the I/O Modules 140 along with overwrite data and an overwrite address. The overwrite data is written to the overwrite address within the MSU regardless of the existence of any other copies of the data existing for that address anywhere else in the Platform. To facilitate the Overwrite command, the directory state information for the overwrite address is read from the MCL. A MSU then issues Purge functions to any PODs having shared access to the cache line, or issues a Return function. to any POD having exclusive ownership of the cache line. The directory state information is then updated to indicate the MSU owns the data, and the overwrite data is written to the MCL.

Finally, if none of the above discussed commands are received from the POD during a POD-initiated operation, the operation is a Message Operation. The message data is provided to the POD Data Block 710 associated with the sending POD 120. When the requested one of the interfaces on Lines 750 is available within the MDA, the MCA controls the transfer of message data from the sending one to the destination one of the POD Data Blocks 710, as shown in Block 1340. The MCA further controls the generation of responses to the PODs. Specifically, the one of the POD Data Blocks 710 associated with the destination one of the PODs generates a response to the destination one of the PODs indicating message data is available. The one of the POD Data Blocks associated with the sending one of the PODs generates a response signal to the sending one of the PODs indicating the message was successfully sent.

Figure 14B:
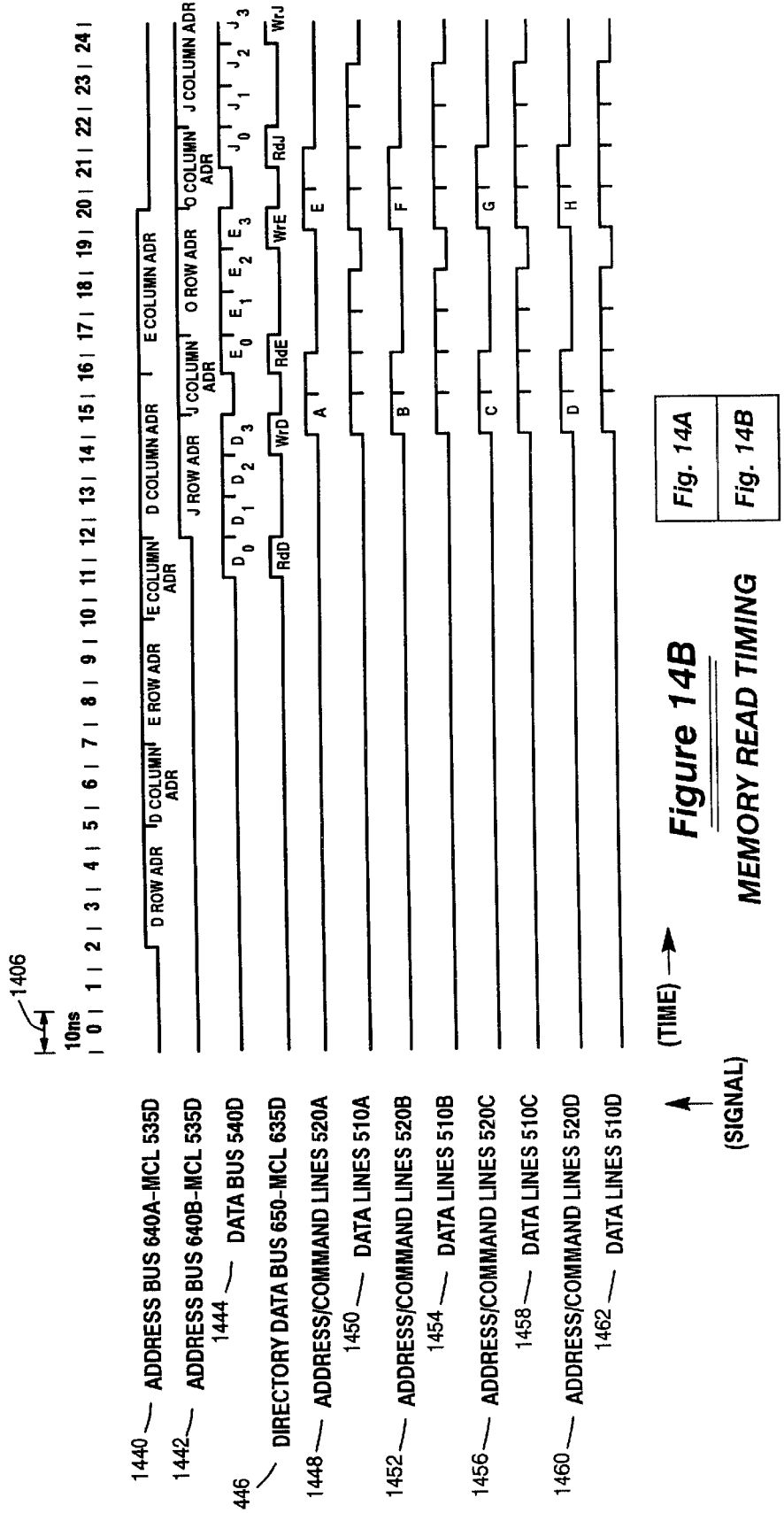
FIG. 14 is a timing diagram of multiple PODs performing simultaneous read operations to the MSU.

FIG. 14 is a Timing Diagram of Memory Reads being performed to a fully-populated MSU. The MSU operates using- a two-phase clock that includes a Phase 1 Clock Signal 1402 and a Phase 2 Clock Signal 1404. Both of these signals have a period, or "clock cycle", of 10 nanoseconds (ns) as shown by Line 1406.

Lines 1408, 1410, 1412, and 1414 show PODs 120A, 120B, 120C, and 120D, respectively, each providing four requests in a row over Address/command Lines 520 for a total of 16 outstanding requests. The Address/command Lines are capable. of transferring one request every 20 ns. These requests are queued within the respective one of the POD Address Control Blocks 1010 for the requesting POD 120. Up to 16 requests from the same POD may be queued within a MSU at once. Therefore, a total of 64 requests from all of the PODs may be pending to a MSU at any given time.

Lines 1416, 1424, 1432, and 1440 represent request addresses A, B, C, and D being driven via an addressed one of the Memory Cluster Control Blocks 1020 onto Address Bus 640A within MCL 535A, 535B, 535C, and 535D, respectively. Note that in this example, each of the addresses A, B, C, and D are selected to map to the first Address Bus 640A, and each are within a different one of the MCLs 535.

This is a somewhat arbitrary selection that is made to illustrate the maximum parallelism which may be achieved within the memory system of the current invention. Some of the addresses A, B, C, and D could just as easily map to the second Address Bus 640B within the addressed MCL 535 and the same level of parallelism could be achieved, as long as four of the sixteen requests maps to each of the MCLs.

Returning again to the current example, in the preferred embodiment, an address may be driven onto Address Buses 640A or 640B within an MCL 535 approximately 25 ns after the Address is driven by one of the PODs 120. The timing of the address signals on Address Buses are dictated by the SDRAMs within the MSU Expansions 610. As shown in any one of Lines 1416, 1424, 1432, or 1440, first the row address, which is a predetermined portion of the cache line address, is presented to the SDRAMs, where it is latched. Approximately three clock cycles later, the column address, which provides the remainder of the address bits, is provided to the SDRAMs. Approximately four clock cycles later, the cache line data is provided from the addressed ones of the MSU Expansions to the MDA 530 on Data Buses 540A, 540B, 540C, and 540D as shown on Lines 1420, 1428, 1436, and 1444. The 64-byte cache line requires four transfers of 16 bytes each to complete over the 128-bit Data Buses 540.

At the same time as the first one of these four transfers is occurring, one transfer is performed over Directory Data Buses 650 of the MCLs to provide the directory state information associated with each of the cache line transfers, as shown on Lines 1422, 1430, 1438, and 1446. This information is received by the Directory ECC Generate/Correct Decode 1290 within the Memory Cluster Control Blocks 1020 so that data ownership status can be determined. Memory Cluster Control Blocks generate updated directory state information to reflect the new ownership. At approximately the same time the last data transfer is being performed across data buses 540 to the MDA, the Memory Cluster Control Blocks 1020 write updated directory state information back to the addressed Directory Storage Arrays to reflect the new ownership information, as shown on Lines 1422, 1430, 1438, and 1446. It may be noted that prior to this write operation to the Directory Storage Arrays 630, the column addresses for address A, B, C, and D must again be provided on Address Buses 640 as shown on Lines 1416, 1424, 1432, and 1440. The row addresses need not be provided again because they are stored within the SDRAMs.

In a best case scenario as shown in FIG. 14, all cache lines may be transferred immediately after reception by the MSU Data Blocks 720 to the one of the POD Data Blocks 710 associated with the returned data. The cache lines are then available for presentation to the requesting POD by the POD Data Blocks 710 approximately one-half clock cycle before the last transfer of the cache line is completed from the MSU Data Blocks to the POD Data Blocks. The transfers from the POD Data Blocks 710 to the associated PODs are shown on Lines 1450, 1454, 1458, and 1462. Data Lines 510 each include 64-bit wide data paths such that each 64-byte cache line requires eight transfers to complete, with two transfers being completed every clock cycle. At substantially the same time the first data transfers are occurring over Data Lines 510, response signals are provided by POD Address Control Blocks 1010 to the associated POD 120 to indicate that data is available, as shown on Lines 1448, 1452, 1456, and 1460.

After the eight transfers associated with a single cache line are completed to a POD, a one clock cycle inactive cycle is required before another cache line data transfer may be initiated, as shown on Lines 1450, 1454, 1458, and 1462.

This is necessary to allow different ones of the MSU Expansions 610 to begin driving the Data Buses 540.

Returning now to the waveforms representing the MCL Address Buses 640A, shown as Lines 1416, 1424, 1432, and 1440, it may be noted that after the column address for A, B, C, and D are provided to the Data Storage Arrays 620, another set of column and row addresses, namely addresses F, G, H, and E, are driven onto Address Buses 640A. Assume addresses A, B, C, and D are mapped to MSU Expansions 610A (see FIG. 6) in each of MCLs 535A, 535B, 535C, and 535D, respectively. Further assume for illustration purposes that addresses F, G, H, and E map to the other MSU Expansions 610C associated with Address Bus 640A in each of MCLs 535A, 535B, 535C, and 535D, respectively. This mapping allows the Fetch operations for the addresses F, G, H, and E to be initiated within MSU Expansions 610C while MSU Expansions 610A are in the process of performing the first set of Fetch operations. The MSU Expansions 610A will eventually return the cache lines from each of the MCLs 535 to the associated MSU Data Blocks 720 on the respective one of Data Buses 540A, 540B, 540C, and 540D. For example, the cache line associated with address A will be returned from MSU Expansion 610A on Data Buses 540A to MSU Data Block 720, and so on. After the transfers are complete, a minimum 10 ns dead cycle is imposed on the Data Buses 540, then MSU Expansions 610C can begin driving the Data Buses 540 with cache lines from addresses F, G, H, and E. This interleaving of addresses utilizes both Address Buses 640 and Data Buses 540 to full capacity.

The above example shows how a first and second set of addresses may be interleaved on the same Address Bus 640 so that the Data Bus 540 may be fully utilized. Addresses may be interleaved in another manner within each of the MCLs 535. The waveforms on Lines 1418, 1426, 1434, and 1442 shows how a third set of addresses is provided to another set of MSU Expansions 610B (see FIG. 6) on Address Buses 640B at the same time the second set of addresses F, G, H, and E are still being driven on Address Buses 640A. This third set of addresses K, L, I, and J allow the Fetch Operations to being within the SDRAMs of MSU Expansions 610B so that when the second set of cache lines have been transferred over Data Buses 540 and the prerequisite dead cycle has been observed, the MSU Expansions 610B may immediately begin transferring the cache line data over the Data Buses. This is shown on Lines 1420, 1428, 1436 and 1444.

Finally, it may be noted that addresses may be interleave to Address Buses 640B in the same manner discussed above with respect to Address Buses 640A. Lines 1418, 1426, 1434, and 1442 show addresses P, M, N, and O interleaved on Address Buses 640B with addresses K, L, I, and J. This example assumes that addresses K, L, I and J map to MSU Expansions 610D so that interleaving may be performed in this manner.

Several more observations. may be made concerning the timing and control associated with examples of FIG. 14. First, these examples assume a best-case scenario in which an equal number of exactly one request address maps to each MSU Expansion. This allows the optimal parallelism to be obtained within the MSU so that bus structures can be fully utilized and throughput can be maximized. In contrast, a worst-case scenario would occur if all addresses A through P mapped to the same MSU Expansion in the same MCL so that all operations are completely serialized over the same Address Bus 640.

To fully utilize the parallelism of the inventive bus structure, state machines within the MCA 550 control the presentation of addresses to the MCLs in an order which does not necessarily observe a first-in, first-out regiment. For example, within each of the Memory Cluster Control Blocks 1020, request addresses are queued within Memory Cluster Request Queue 1220 to await presentation to the associated MCL. As soon as one of the Address Buses 640 within the MCL becomes available to receive another request, the oldest request within the Memory Cluster Request Queue 1220 that maps to an MSU Expansion 610 coupled to that Address Bus will be presented to the MCL. As a result, memory requests are not necessarily processed in order. Thus job numbers must be provided to the PODs to identify the data when it is returned from the main memory, as is discussed above.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. A crossbar interconnection system for connecting a plurality of memory units to a plurality of processor and I/O units in a computer system, wherein substantially every processor unit and substantially every I/O unit connects to receive data from said plurality of memory units through a unit port connected to said crossbar interconnection system and wherein every memory unit connects to said crossbar interconnection system through a memory port connected to laid crossbar interconnection system, said crossbar interconnection system comprising:

a unit port interface having a split output buffer system for sending data to any unit port, said split output buffer system having a plurality of buffers connected to receive data output from said memory units into a one of a plurality of read buffers that is least full, said plurality of read buffers each being connected to send data to one of said unit ports, in a sequential manner by an read output port line controller, said read output port line controller programmed to cause a change in said sequence if one or more of said plurality of read buffers is waiting for a busy unit port, in which event, another of said plurality of read buffers is permitted to send data to a non-busy unit port.

2. A crossbar interconnection system as set forth in claim 1, further comprising:

a memory port interface having a split output buffer system for sending data to any memory port, said split output buffer system having a plurality of write buffers connected to receive data output from said units into a one of a plurality of said write buffers that is least full, said plurality of write buffers each being connected to send data to one of said memory ports, in a sequential manner by a write output port line controller, said write output port line controller programmed to cause a change in said sequence if one or more of said plurality of write buffers is waiting for a busy memory port, in which event, another of said plurality of write buffers is permitted to send data to a non-busy memory port.

3. A crossbar interconnection system for connecting a plurality of memory units to a plurality of processor and I/O units in a computer system, wherein substantially every processor unit and substantially every I/O unit connects to receive data from said plurality of memory units through a unit port connected to said crossbar interconnection system and wherein every memory unit connects to said crossbar interconnection system through a memory port connected to said crossbar interconnection system, said crossbar interconnection system comprising:

a memory port interface having a split output buffer system for sending data to any memory port, said split output buffer system having a plurality of write buffers connected to receive data output from said units into a one of a plurality of said write buffers that is least full, said plurality of write buffers each being connected to send data to one of said memory ports, in a sequential manner by a write output port line controller, said write output port line controller programmed to cause a change in said sequence if one or more of said plurality of write buffers is waiting for a busy memory port, in which event, another of said plurality of write buffers is permitted to send data to a non-busy memory port.

4. A crossbar interconnection system for connecting a plurality of memory units to a plurality of processor units in a computer system, wherein substantially every processor unit connects through a unit port to said crossbar interconnection system and wherein every memory unit connects to said crossbar interconnection system through a memory port:

a unit port interface having a split output buffer system for sending data to any unit port, said split output buffer system having a plurality of buffers connected to receive data output from said memory units into a one of a plurality of read buffers that is least full, said plurality of read buffers each being connected to send data to one of said unit ports, in a sequential manner by an read output port line controller, said read output line controller programmed to cause a change in said sequence if one or more of said plurality of read buffers is waiting for a busy unit port, in which event, another of said plurality of read buffers is permitted to send data to a non-busy unit port.

5. A computer system having a plurality of units, said units being main memory units, processor units, and I/O units, each of said units having a unit port connecting it to receive data from a crossbar interconnection system from another of said units, said crossbar interconnection system comprising:

a first unit port interface having a split output buffer system for sending data to any of said unit ports, said split output buffer system having a plurality of send buffers connected to receive data output from one of said unit ports into a one of a plurality of said send buffers that is least full, said plurality of send buffers each being connected to send data to a first unit port, said plurality of send buffers' output being controlled to occur in a sequential manner by a send output port line block controller, said send output line block controller programmed to cause a change in said sequence if one or more of said plurality of send buffers is waiting for a busy unit port, in which event, another of said plurality of send buffers is permitted to send data to a non-busy memory port.

6. For use with a crossbar interconnect system that interconnects a plurality of input ports to a plurality of output ports, a method to transfer data into any of the plurality of output ports from one of the plurality of input ports using split send data queues, the method comprising:

receiving uniformly sized data units serially from said input port, said data units being identified to a particular one of a plurality of output ports;

sequestering each said data unit in a less full part of said split send data queue first; and sending said data unit from one part of said split send data queues to an output port unless said data unit is identified to an output port which is busy, then in such event, sending a data unit from a second part of said split send data queues to a different output port.

7. The method of claim 6 wherein said split send data queue comprises two buffers and said sequestering of said data units is shifted between them on a least full basis.

8. The method of claim 6 wherein each split send data queue is comprised of a plurality of buffers operating to receive and send data units on a FIFO basis.

\* \* \* \* \*